United States Patent

[11] 3,572,565

[72] Inventor  Douglas L. Steggall
              London, England
[21] Appl. No. 767,608
[22] Filed     Oct. 15, 1968
[45] Patented  Mar. 30, 1971
[73] Assignee  Selectro-Micro Company Limited
              London, England
[32] Priority  July 3, 1968, July 12, 1968
[33]           Great Britain
[31]           31,671/68 and 33,307/68

[54] INFORMATION RETRIEVAL APPARATUS
     7 Claims, 26 Drawing Figs.
[52] U.S. Cl. .................................................. 226/33,
                                       226/135, 340/174.1
[51] Int. Cl. ......................................... B65h 23/18
[50] Field of Search ........................................ 226/9, 33,
                       43, 135; 179/100.2 (S); 340/174.1 (C)

[56]              References Cited
              UNITED STATES PATENTS
2,923,921  2/1960  Shapin .......................... 226/43UX
3,248,030  4/1966  Ganzhorn ....................... 226/33

Primary Examiner—Richard A. Schacher
Attorney—Smith, Michael, Bradford & Gardiner ABSTRACT: Information retrieval apparatus, particularly for locating a desired frame on a microfilm strip, comprises a photoelectric transducer for detecting the passage therepast of markers on the film strip, each marker being associated with a particular frame, a counter for counting the corresponding signals produced by the transducer, storage means for storing the serial number of a frame to be brought to a reading position, comparing means for continually comparing the count of the counter with the stored serial number, and means for arresting the film movement when the comparison shows equality. The storage means also includes means for storing the serial number of the frame initially in the reading position, this number being also fed into the counting means to provide a datum count. The apparatus also includes means for sensing that the desired frame is approaching the reading position and for slowing down the film so as to avoid overshoot when the film is finally arrested. The apparatus can drive the film in either direction to locate the desired frame and, when one desired frame has been located, a further desired frame can be located without having to rewind the film to a datum position.

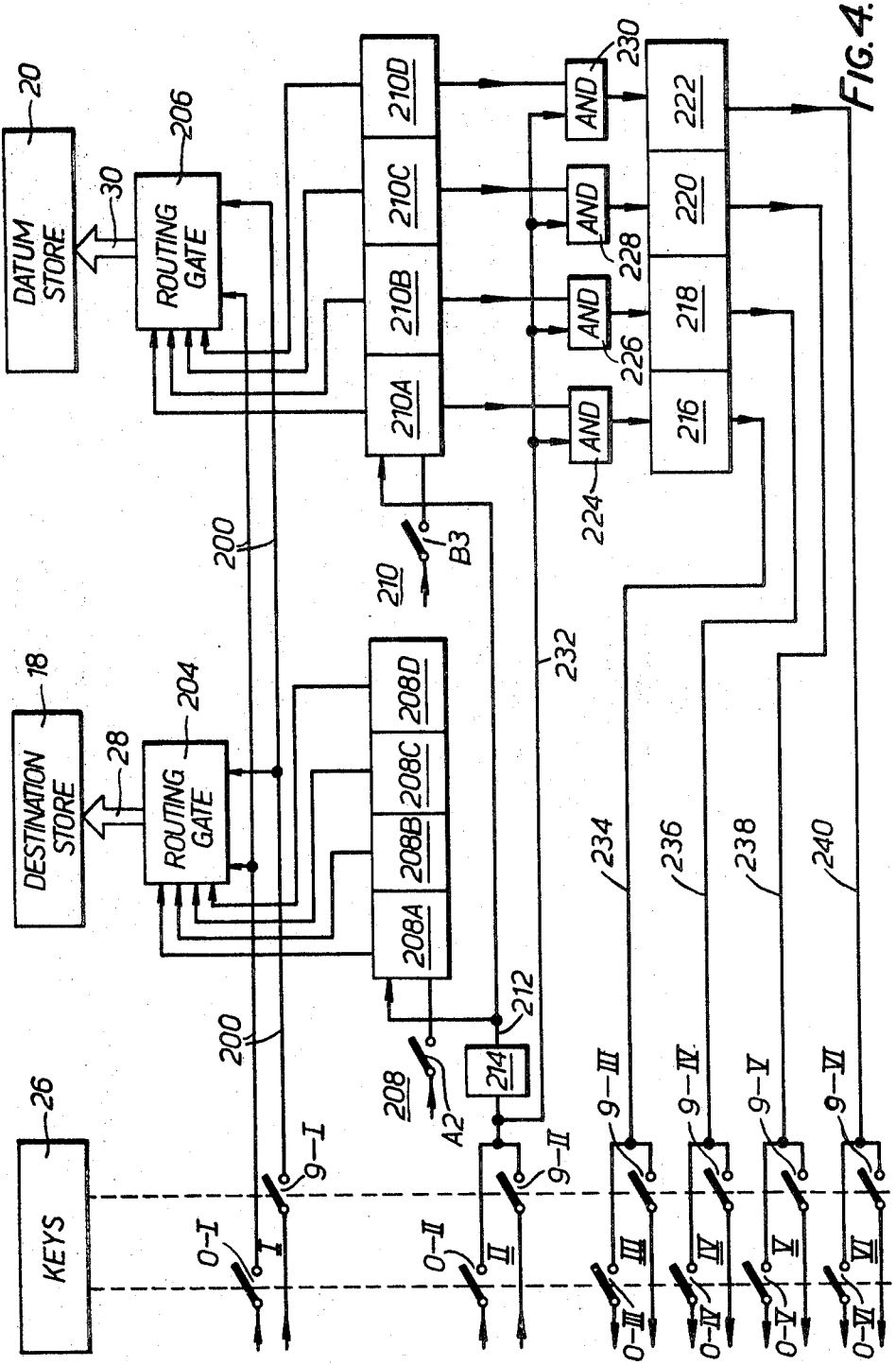

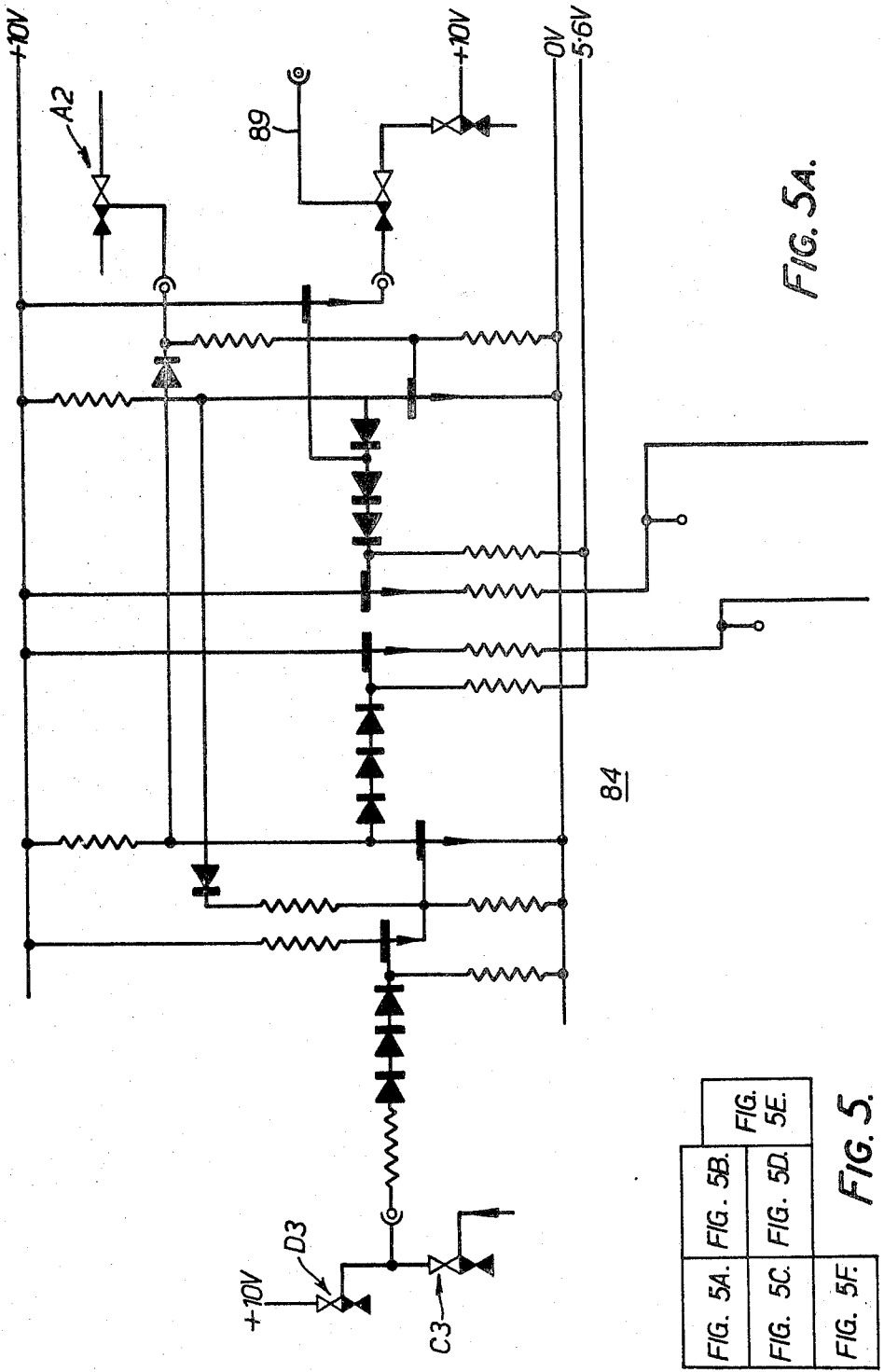

Patented March 30, 1971
3,572,565
23 Sheets-Sheet 11
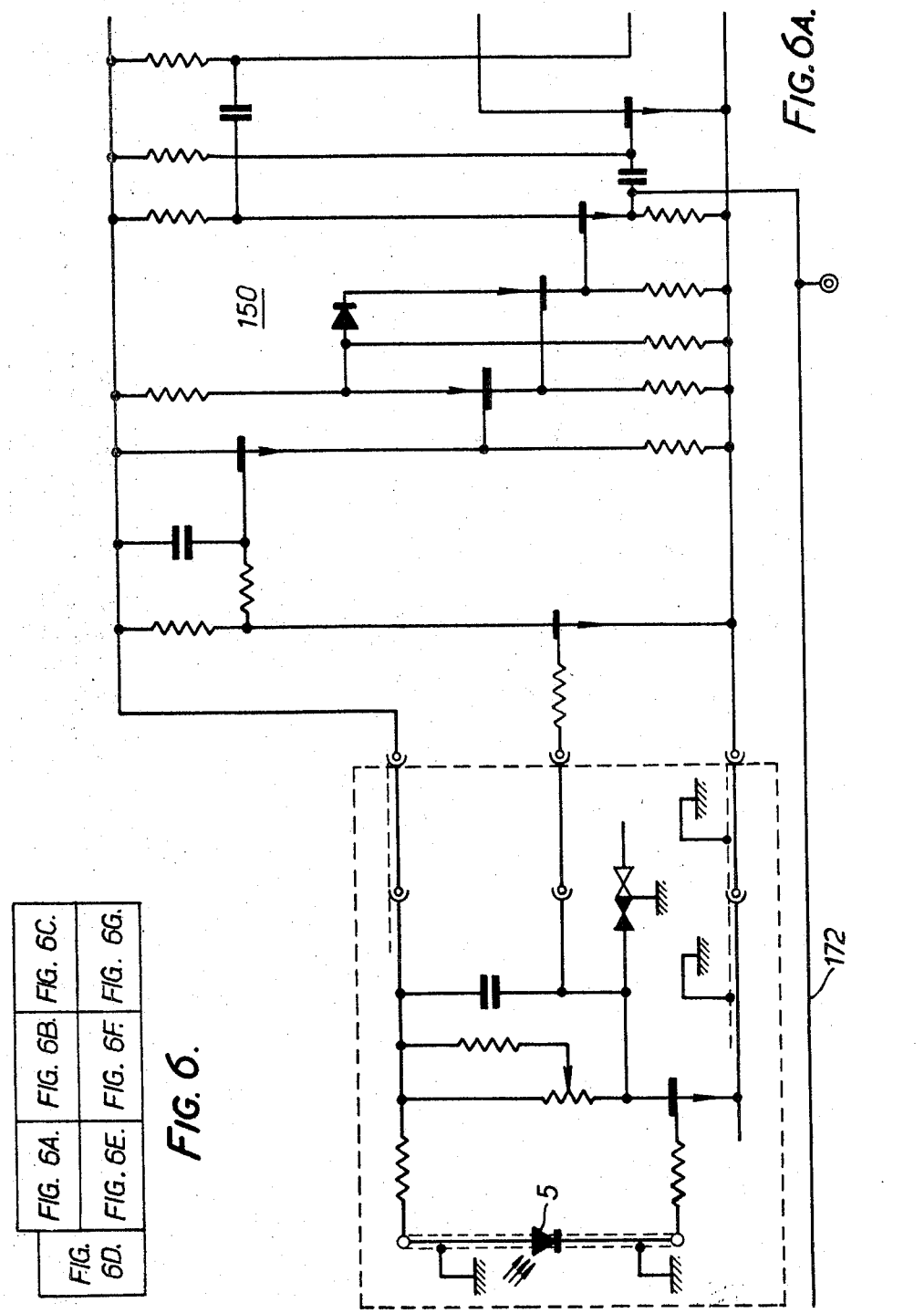

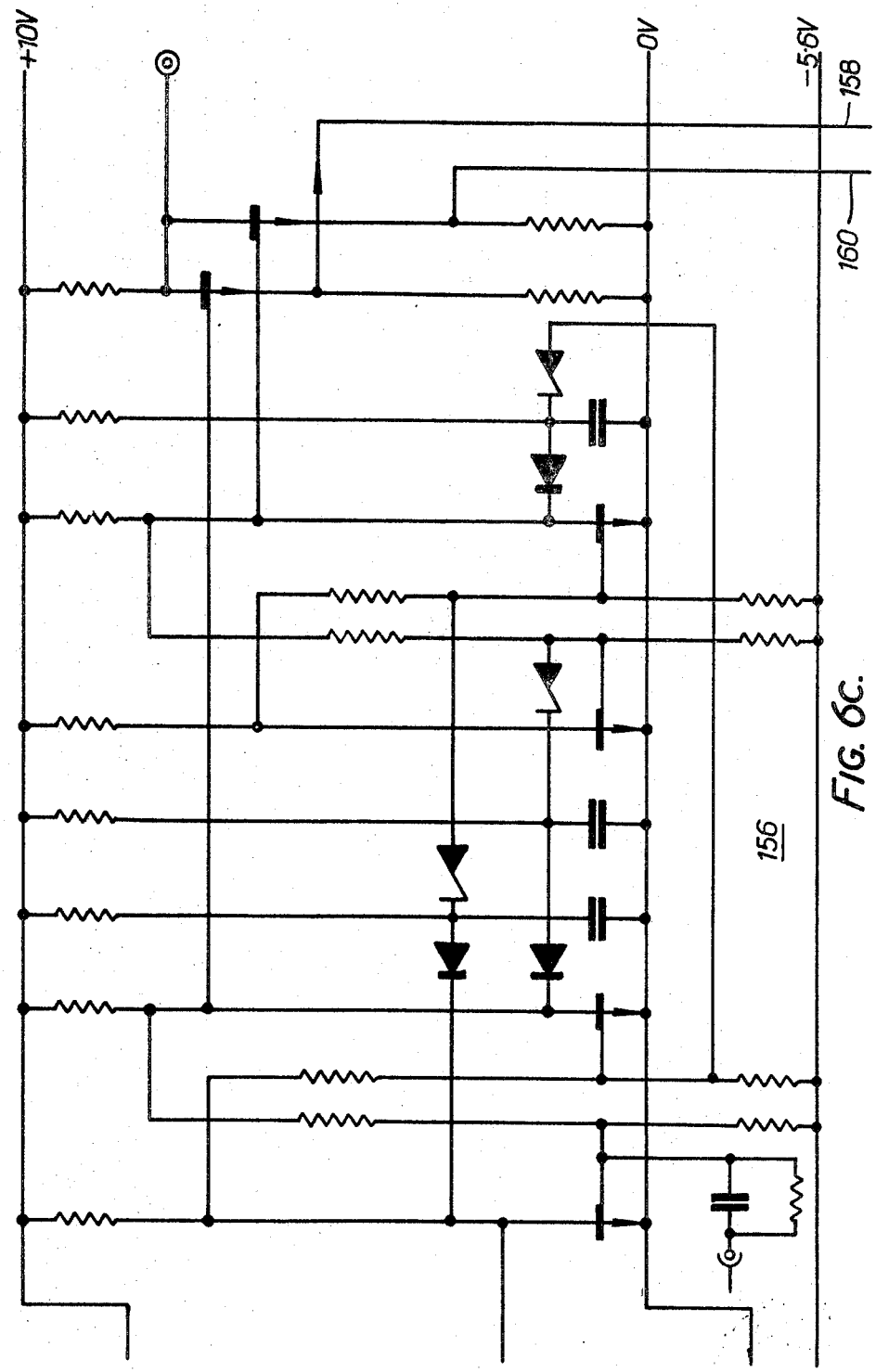

Patented March 30, 1971

| FIG. 7A. | FIG. 7B. | FIG. 7C. |
| --- | --- | --- |
| FIG. 7D. | FIG. 7E. | FIG. 7F. |

INVENTOR
DOUGLAS L. STEDGALL
BY
Bradford
ATTORNEYS

INFORMATION RETRIEVAL APPARATUS

BRIEF SUMMARY OF THE INVENTION

The invention relates to the control of a longitudinally movable recording medium such as film or tape having information recorded thereon (visually, for example) at intervals therealong.

According to the invention, there is provided apparatus for controlling the movement of a longitudinally movable recording medium having a plurality of longitudinally arranged areas in which information can be recorded and a marker associated with each area, comprising transducer means, mounting means mounting the transducer means adjacent the path of longitudinal movement of the recording medium whereby the transducer means produces a respective electrical signal in response to the movement of each said marker therepast, counting means connected to count the said electrical signals, storing means operative to store a number identifying a particular desired marker, comparing means connected to the counting means and the storage means and operative to compare the instantaneous count of the counting means with the said number in the storage means as the recording medium moves along the said path, and arranged to produce a control signal when equality between the said count and said number is detected, and control means responsive to the control signal to arrest movement of the said recording medium.

According to the invention, there is also provided apparatus for controlling the movement of a longitudinally movable recording medium having a plurality of longitudinally arranged areas in which information can be recorded and a respective marker associated with each area, comprising means mounting the recording medium for movement along a predetermined path, driving means for driving the recording medium along the said path, transducer means, means mounting the transducer means adjacent the path of movement of the recording medium whereby the transducer means produces a respective electrical signal in response to the movement of each marker therepast, counting means connected to count the electrical signals so produced, first and second stores, writing means selectively connectable to the first and second stores while the recording medium is stationary and operable to store in the first store a first number identifying the particular marker in a reference position in the said path and operable to store in the second store a second number identifying the particular marker to be brought, by appropriate movement of the recording medium, to a reference position in the said path, transfer means responsive to the writing means and operative while the recording medium is stationary to count up the counting means by a count corresponding with the said first number, comparing means connected to the counting means and the storage means and operative to compare the instantaneous count of the counting means with the said second number as the recording medium moves along the said path, and arranged to produce a control signal when the said count corresponds with the second number, and control means responsive to the control signal and operative to arrest the movement of the recording medium.

According to the invention, there is further provided apparatus for controlling the movement of a longitudinally movable recording medium, comprising means mounting the recording medium for movement along a predetermined path, driving means operative to drive the recording medium along the said path, a marker associated with at least one end of the recording medium, transducer means, means mounting the transducer means adjacent the said path whereby it produces an electrical signal in response to detection of the said marker, and control means responsive to the electrical signal and operative to arrest the movement of the recording medium.

According to the invention, there is still further provided apparatus for controlling the movement of a longitudinally movable recording medium having a plurality of longitudinally arranged areas in which information can be recorded and a respective marker associated with each area, comprising first mounting means mounting the recording medium for movement along a predetermined path, driving means connected to drive the recording medium along the said path, transducer means, second mounting means mounting the transducer means adjacent to said path whereby the transducer means produces a respective electrical signal in response to the movement of each marker therepast, counting means connected to count the number of electrical signals produced, storage means operative to store an identifying number identifying a particular marker which is to be positioned, by appropriate movement of a recording medium, in a reference position in the said path, means operative to add a predetermined number to the count of the counting means so that, as the recording medium moves along the said path, the instantaneous count of the counting means is in excess, by the amount of the said predetermined number, of the number of electrical signals counted, comparing means connected to the counting means and the storage means and operative to compare the instantaneous count of the counting means with the said identifying number in the storage means, and arranged to produce a control signal when the instantaneous count corresponds with the identifying number, first control means responsive to the control signal and connected to the driving means and operative to reduce the speed of the driving means in response to occurrence of the control signal, and second control means operative to arrest movement of the recording medium when the number of electrical signals produced by the transducing means after occurrence of the said control signal becomes equal to the said predetermined number.

According to the present invention, there is yet still further provided apparatus for controlling the movement of a longitudinally movable recording medium having a plurality of longitudinally arranged areas in which information can be recorded and a respective marker associated with each area, comprising first mounting means mounting the recording medium for movement along a predetermined path, driving means connected to drive the recording medium along the said path, transducer means, second mounting means mounting the transducer means adjacent the said path whereby the transducer means produces a respective electrical signal in response to movement of each marker therepast, each electrical signal comprising first and second time-displaced portions respectively produced by longitudinally-spaced regions of each marker, storage means operative to store an identifying number identifying a particular desired marker which is to be positioned, by appropriate movement of the recording medium along the said path, in a reference position in the path, counting means connected to the transducer means to count one said portion only of each electrical signal produced by the transducer means, comparing means connected to the counting means and the storage means and operative to compare the instantaneous count of the counting means with the said identifying number in the storage means whereby to produce a control signal when the instantaneous count corresponds with the identifying number, control means responsive to the control signal for arresting the movement of the recording medium when the control signal occurs, and gating means interconnected between the transducer means and the counting means and operative to feed the first portion only of each electrical signal to the counting means, for counting thereby, when the recording medium is moving in one direction along the said path and operative to feed the second portion only of each electrical signal to the counting means, for counting thereby, when the recording medium is moving in the opposite direction along the said path, whereby the said one portion of each electrical signal which is counted by the counting means is the portion produced by the leading region of each said marker.

DRAWINGS

Apparatus embodying the invention for controlling the movement of microfilm will now be described by way of example only, reference being made to the accompanying drawings, in which:

FIGS. 2, 3 and 4 are block diagrams of various parts of the apparatus illustrated in FIG. 1.

Figure 1:
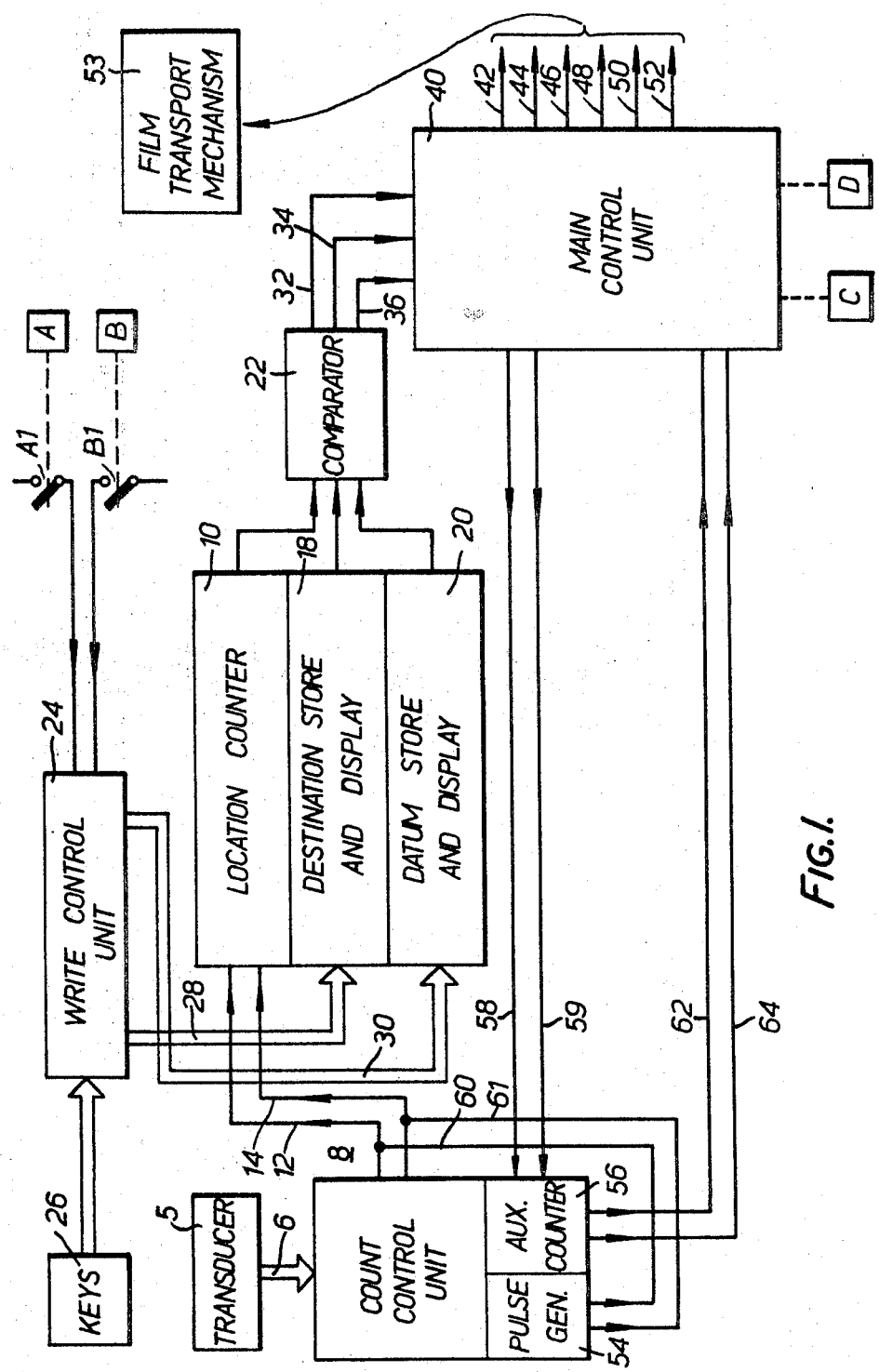
FIG. 1 is a block circuit diagram of the apparatus.

An item in any FIG. of the drawings which corresponds to an item in any other FIG. is similarly referenced.

DETAILED DESCRIPTION

In the drawings, a number of switches referenced A, B, C, D, E, F and G are shown and the sets of contacts operated by each switch are indicated by the appropriate letter followed by a serial number. Unless otherwise shown on the drawings, one contact of each set is assumed to be connected to a power supply so that closure of the set energizes the other contact. The switches A to G may comprise relays interlocked to ensure correct sequence of operation.

The apparatus to be described is for controlling the movement of microfilm in strip form; that is, the microfilm comprises a film strip having a plurality of visual images or frames thereon, arranged end-to-end. In use, the microfilm is driven by film transport mechanism from one spool to another under control of the apparatus to be described so as to present any particular desired frame into a control or viewing position where, by optical or other means, it is projected in magnified form on to a viewing screen for an operator's attention and/or is photographed or otherwise reproduced. The apparatus to be described enables any particular frame on the microfilm to be searched for and presented at the viewing position.

GENERAL DESCRIPTION

In accordance with the invention, a respective marker is located on the microfilm alongside each frame, and in use the microfilm is driven along a path which passes between a light source and a photoelectric transducer 5 (FIG. 1), the latter being located at the control or viewing position. Each marker is substantially opaque to the light, and the photoelectric transducer 5 therefore produces a first signal (a light-to-dark signal) as each marker moves into position in front of the transducer and a second signal (a dark-to-light signal) as the film movement carries the marker away from the transducer. These two signals are fed by a channel 6 to a count control unit 8 which is arranged either to suppress all the first signals or to suppress all the second signals, according to the direction of microfilm movement, and to convert each of the signals not suppressed into a respective double pulse which is fed into a location counter 10 by means of lines 12 and 14, the location counter forming part of a counter and store unit 16.

The unit 16 also includes two stores 18 and 29 and a comparing unit 22. The store 18 is arranged to store a number, referred to as a destination number, representing the frame number of the desired frame. The store 20 is arranged to store a number, referred to as the datum number, representing the frame number of the frame initially located in correspondence with the transducer 5 before film movement begins. The destination and datum numbers are written into the stores 18 and 20 by the operator using a write control unit 24 and a set of digit keys 26.

The set of keys 26 comprises 10 keys numbered 0 to 9 which are used in conjunction with two switches A and B. Switch B is operated when the datum number is to be written into the store 20 and closes contacts B1. The operator then operates the appropriate keys, in a manner to be explained, to write the datum number into the store 20 by means of a channel 30. During this writing operation, the marker of the frame whose number is being written into the store as the datum number must be accurately located in correspondence with the transducer 5. Switch B is then released and switch A is operated to close contacts A1. The keys are then again operated to write the destination number into the store 18 by means of a channel 28. Each of the stores 18 and 20 has a respective display associated with it so that the operator can ascertain that each number is correctly written into the store.

The comparator 22 is arranged to compare, continuously, (decade by decade) the numbers respectively held in the counter 10, the store 18, and the store 20. The comparator 22 has three output lines 32, 34, and 36, which are connected to a main control unit 40. The unit 40 is controlled by two switches C and D and has six output lines 42 to 52 which are connected to control the operation of the film transport mechanism 53. Switch C is termed the "locate destination" switch and is operated when it is desired to cause the apparatus to locate a particular frame represented by the destination number written into the store 18. Switch D is termed "locate datum" switch and is operated, after a desired frame has been located, when it is desired to cause film to revert to its original position. A signal on line 42 causes the film transport mechanism to drive the film forward. A signal on line 44 causes the transport mechanism to drive the film in the reverse direction. The line 46 controls the speed of movement: when a signal is present on the line 46, the transport mechanism runs slowly in a direction determined by the one of the lines 42 and 44 which is energized; when line 46 is not energized, the transport mechanism runs at high speed in the direction determined by the one of the lines 42 and 44 which is energized. When line 48 is energized, the transport mechanism is stopped in a "standby" condition. When line 50 is deenergized, a normally applied lock preventing movement of the transport mechanism is released. Line 52 is energized when the film reaches an end position and causes a "crash stop." The reaching of the end position is sensed by an auxiliary photocell 105 (FIG. 2) mounted so as to be insensitive to the above mentioned frame markers but sensitive to an opaque leader portion at each end of the film.

Associated with the count control unit 8 is a pulse generator 54 and an auxiliary counter 56. The pulse generator 54 is connected to the main control unit 40 by means of lines 58 and 59 and, when activated by the main control unit, causes the counter 56 to count up to a predetermined maximum count at which it halts. The pulse generator 54 is also connected to the counter 10 by means of lines 60 and 61 and produces pulses on these lines, as the counter 56 counts up, which pulses count up the counter 10 by the same amount. The counter 56 has two further output lines 62 and 64. Line 62 is energized when the count of the counter 56 reaches the predetermined maximum, and line 64 is energized when the count of counter 56 is zero.

OPERATION

The operator operates the keys 26 to write into the stores 18 and 20 the appropriate destination and datum numbers as explained. As the datum number is written into the store 20, a similar number is automatically written into the location counter by means to be described (since the number of the frame located in correspondence with the phototransducer 5 at this stage is the same as the datum number). The operator then operates the switch C whereupon the main control unit 40 energizes the pulse generator 54 by means of a signal on line 58. Counter 56 is therefore counted up from zero to its maximum and increases the count in counter 10 by a corresponding amount. When the count of counter 56 has reached its maximum, line 62 is energized and causes the main control unit 40 to energize line 42. The film transport mechanism therefore drives the film in the forward direction at high speed past the transducer 5. As each frame moves past the transducer, the resultant double pulse from unit 8 is fed to the unit 16 on lines 12 and 14 and counts up the location counter 10 by one. It will be appreciated that the count in the counter 10 is continuously in excess of the number of the frame passing the transducer 5 at any time, the amount of the excess being equal to the maximum count of the counter 56.

The comparator 22 continuously compares the numbers in the counter 10, the store 18, and the store 20, and energizes line 34 when the number in the location counter 10 becomes equal to the destination number. Thereupon, the main control unit 40 energizes the line 46 so as to reduce the speed of the film transport mechanism. At the same time, the unit 40 energizes line 59 so that, as the film continues to move past the transducer 5, the pulses produced thereby are now fed into the counter 10 instead of the counter 10, and count down the counter 56. When the counter 56 reaches a count of zero, line 64 is energized whereupon the unit 40 energizes line 48 and stops the film transport mechanism. It will be seen that the number of the frame now located in correspondence with the transducer 5, and thus in the viewing position, is the same as the destination number, since the effect of the addition made to the number in the counter 10 at the beginning of the operation (by feeding in the pulses produced by counting up the counter 56) has been offset by the counting down of the counter 56 at the end of the operation. The use of the counter 56 enables the main control unit to slow down the film transport mechanism before the desired frame is reached and thus reduces or eliminates the possibility of overshoot. The maximum count of the counter 56 determines the instant at which the film speed is reduced, and this maximum count is selected so as to be just sufficient, taking into account the inertia of the transport mechanism and other factors, to prevent overshoot. Means may be provided to enable the maximum count of the counter 56 to be preset to different values to take into account different lengths of film and other factors which may affect the inertia of the transport mechanism.

If the operator now wishes to locate another frame along the film, he reoperates switch A and writes into the store 18 the new destination number by means of the keys 26 and the write control unit 24. During this process, switch C is automatically switched off. At the completion of the writing process, the operator reoperates switch C and the apparatus then operates in a manner similar to that described above to locate the new desired frame, the counter 56 again being counted up initially, (before the film commences to move) and counted down again after the film speed has been reduced. It will be appreciated that the direction of film movement during such a searching operation depends on whether the new desired destination is further along the film from the previous destination or further behind. The line 32 is energized by the comparator 22 whenever the destination number is less than the number in the counter 10 and ensures that the film is driven in the correct direction.

When the operator wishes to rewind the film to the original position, he operates switch D (which automatically switches off the switch C). Switch D causes the main control unit 40 to energize the line 58 whereupon, in the manner described above, the pulse generator 54 causes the counter 56 to count up to its maximum count and to increase the count in the counter 10 by a corresponding amount. When counter 56 has reached its maximum, it energizes line 62 whereupon the unit 40 energizes line 44 to cause the transport mechanism to reverse the film at high speed. As before, the comparator 22 continuously compares the count of the counter 10 with the numbers stored in the stores 18 and 20 as the film moves past the transducer 5. When the count in the counter 10 becomes equal to the datum number in the store 20, line 36 is energized, whereupon unit 40 energizes line 46 and reduces the speed of the film transport mechanism. At the same time, line 59 is energized and the pulses from the transducer head 5 are now fed into, and count down, the counter 56 instead of affecting the counter 10. When the count of the counter 56 reaches zero, line 64 is energized whereupon the unit 40 halts the transport mechanism by means of line 48. Thus the counter 56 has again operated to slow down the transport mechanism before the film reaches the desired position in order to prevent overrun.

The apparatus will now be described in more detail with reference to FIGS. 2 to 4.

MAIN CONTROL UNIT DESCRIPTION

The main control unit 40 (FIG. 2) comprises a five stage register 70 which controls the energization of lines 42 to 50 by means of electronic switches or relays 72, 74, 76, 78 and 80. The register has five stages 70A to 70E, and only one stage can be "ON" at any time. Register stage 70A is set ON by closure of contacts C1 or D1. When so set, stage 70A energizes line 58 and causes counter 56 (FIG. 1) to be counted up by the pulse generator 54. Register stage 70B is set ON by energization of line 62 which occurs when the counter 56 has reached its maximum count. When so set, stage 70B feeds an output through an OR gate 82 to switches 72 and 74. Switches 72 and 74 are controlled by a direction store 84 so that only one of them can be operative at any time. The direction store 84 comprises a bistable circuit which is arranged to produce an output on a line 86 when it is 1 state and an output on lines 88 and 89 when in its 0 state; the output on line 86 inhibits operation of switch 74 and the output on line 88 inhibits the operation of switch 72. Line 89 is connected to the count control unit 8. The store 84 is connected to be set into its 1 state through contacts A2 and to be set into its 0 state through contacts C3 and D3. Contacts C3 are supplied by means of the line 32 from the comparator 22 (FIG. 1) which line is energized when the destination number in the store 18 is less than the count of the counter 10.

Register stage 70C is set ON by means of a line 90 which is energized, through an OR gate 92, by either line 34 or line 36 from comparator 22 (FIG. 1). When so set, stage 70C supplies an output through OR gate 82 to switches 72 and 74 and also supplies a further output to switch 76 and to line 59.

Register stages 70D and 70E are set ON by means of line 64 from counter 56 (FIG. 1) under the control of a destination/datum store 94. The store 94 comprises a bistable unit which is set into its 1 state through contacts C4 and in this state it produces an output on a line 96 which inhibits setting of stage 70E. The store 94 is set into the 0 state through contacts D4 and in this state it energizes a line 98 which inhibits setting of stage 70D. Stage 70D produces an output on a line 100, when set ON, which energizes switch 78. Stage 70E energizes a line 102, when set ON, and this signal is passed through an inverter 104 to cause the switch 80 to deenergize the line 50 and thus apply a lock to the film transport mechanism.

Figure 2:
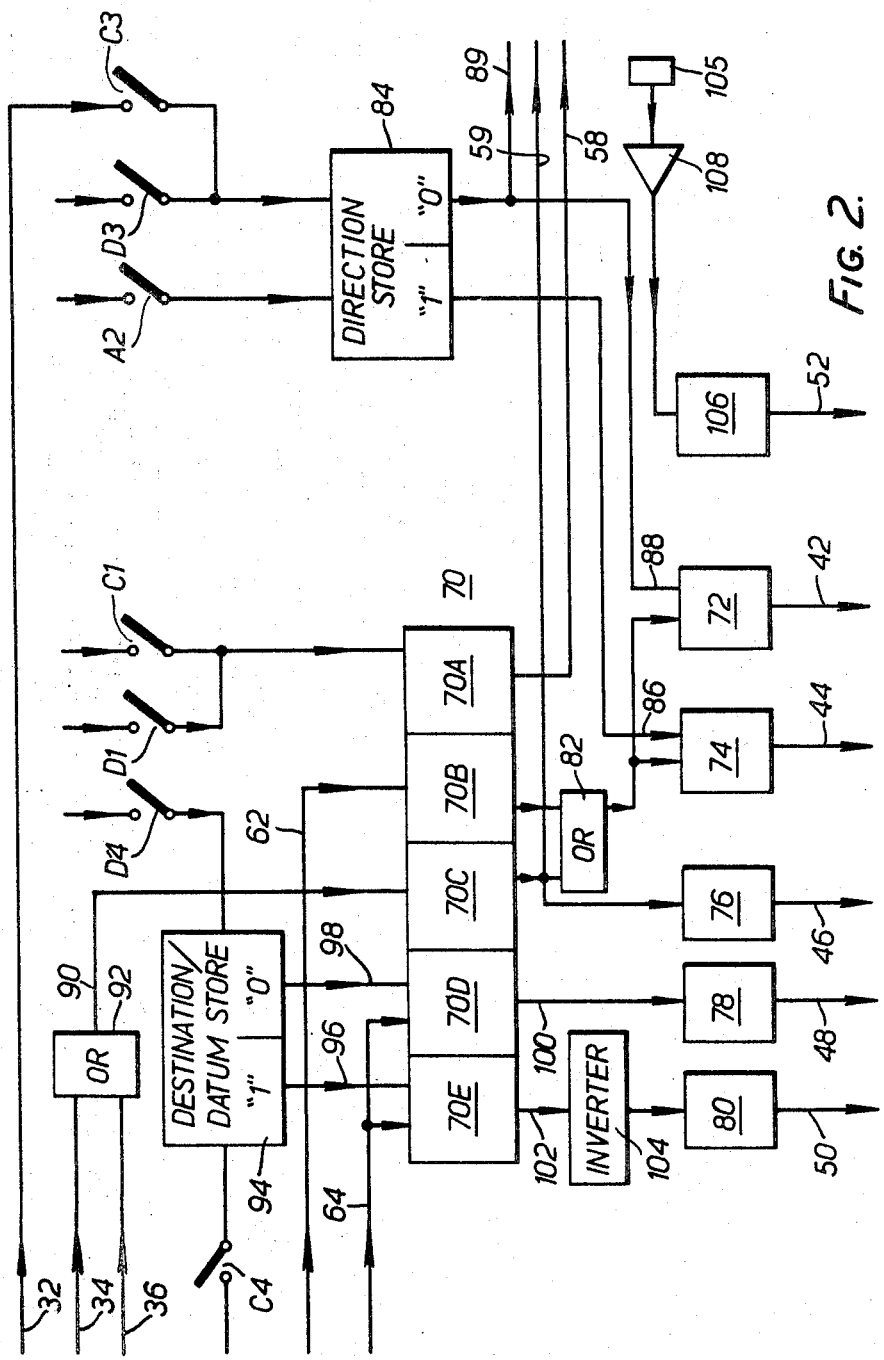

FIG. 2 shows the above mentioned auxiliary photocell 105 which is sensitive to the leaders at the ends of the film. This photocell controls an overrun relay 106 through a preamplifier 108, and the relay 106 controls the energization of the line 52.

OPERATION

The datum and destination numbers are written into the stores 18 and 20 as explained in conjunction with FIG. 1; the closure of switch A while the destination number is being written into the store 18 causes the direction store 84 to be set into its 1 stable state through contacts A2. Switch C is then operated, and the resultant closure of contacts C1 causes register stage 70A to be set ON and line 58 to be energized so that the counter 56 (FIG. 1) counts up under control of the pulse generator 54 and thereby increases the count in the counter 10. Closure of switch C also sets the store 94 into the 1 state through contacts C4.

When the counter 56 (FIG. 1) has reached its maximum count, line 62 is energized and sets register stage 70B ON and thus operates switch 72 (switch 74 being inhibited by the direction store 84) to energize line 42 and thus to cause the film transport mechanism to drive the film forward at high speed.

When comparator 22 (FIG. 1) detects that the count of counter 10 is equal to the destination number, line 34 is energized and sets register 70C ON by means of line 90. Switch 76 is therefore operated to energize line 46, and thus to reduce the speed of the transport mechanism (although stage 70A is no longer ON, switch 72 is maintained operated by stage 70C); at the same time, line 59 is energized and, in the manner explained in conjunction with FIG. 1, causes the pulses from the transducer 5 to count down the counter 56.

When the counter 56 has been counted down to zero, line 64 (FIG. 1) is energized and sets register stage 70D ON, stage 70E being inhibited by line 96.

Line 100 therefore operates switch 78 and line 48 is energized to halt the film transport mechanism in the standby condition. Switches 76 and 72 are no longer operated since neither stage 70A nor stage 70C is now ON.

If the operator now wishes to proceed to locate another frame, he reoperates switch A (which automatically releases switch C) and writes the new destination number into the store 18. He then reoperates switch C, and the stage 70A of register 70 is once more set ON through contacts C1, and if the new desired frame is further along the film, the procedure described above is repeated. If, however, the new desired frame has a lower frame number, line 32 is energized by comparator 22 and sets the store 84 into the 0 state through contacts C3 when switch C is operated. Therefore, the switch 74 is operated when stage 70B goes ON, and the film runs in the reverse direction. The procedure is otherwise the same as described above. Energization of line 89 by store 84 ensures that the pulses produced by the transducer 5 during the reverse film movement count down the counter 10.

If the operator wishes to rewind the film, he operates switch D, which automatically releases switch C. Closure of contacts D3 sets the direction store 84 into the 0 state, and closure of contacts D4 sets the destination/datum store 94 into the 0 state. Closure of contacts D1 sets the stage 70A ON and energizes line 58 to cause the counter 56 (FIG. 1) to be counted up by the pulse generator 54 and thus to count up the counter 10. Stage 70B is then set ON so as to operate switch 74 (switch 72 being inhibited at this time by means of line 86), whereupon the film transport mechanism reverses the film at high speed. When the comparator 22 senses that the count of the counter 10 equals the datum number, line 36 is energized and sets the register stage 70C ON by means of line 90. Switch 76 is therefore operated to energize line 46 and thereby reduce the film speed; although stage 70B is no longer ON, switch 74 is maintained operated by stage 70C. At the same time, line 59 is energized and causes the pulses from the transducer 5 to count down the counter 56. When the counter 56 has been counted down to zero, indicating that the film has reached the datum position, line 64 is energized and sets register 70E into the ON state (stage 70D being inhibited by line 98). Line 102 is therefore energized so as to deenergize line 50 and to release the film cassette.

COUNT CONTROL UNIT DESCRIPTION

The count control unit will now be described with reference to FIG. 3.

The light-to-dark and dark-to-light pulses from the transducer 5 are fed to an amplifier and shaper unit 150 (FIG. 3) and thence to a gate 152, which, according to its setting, allows either the light-to-dark pulses or the dark-to-light pulses to pass; normally, the gate allows the latter pulses only to pass but can be set to allow only the light-to-dark pulses to pass by means of a control signal on either a line 154 or a line 155. The pulses from the gate 152 pass into a double pulse generator 156 which produces two pulses, on lines 158 and 160 respectively, for each single pulse received. Lines 158 and 160 are both connected to a normally on gate 162 and a normally off gate 164. Gate 162 is connected through an amplifier 166 to lines 12 and 14 (see FIG. 1) leading to the location counter 10. Gate 162 is switched off when the line 59 (see FIGS. 1 and 2) is energized at the time when the film transport mechanism is slowed down. When the line 89 is energized from the main control unit (see FIG. 2) during reversal of the film, the gate 162 is caused to invert each double pulse from the double pulse generator 156 so that the counter 10 is counted down instead of up. The location counter may comprise a dekatron counter and thus one of these double pulses serves as a routing pulse, indicating the direction of count, while the other serves as a counting pulse. The output from gate 164 is fed through an amplifier 168 to the counter 56 which comprises two dekatron decades 56A and 56B connected together by a coupling stage 56C. The second decade 56B produces an output on line 62 when it is set in its maximum count setting, and produces a further output on a line 170 when it is in its zero count setting. The line 170, together with a further line 172 carrying the pulses from the transducer 5, supply an AND gate 174 whose output line is the line 64 of FIGS. 1 and 2. When line 58 is energized at the beginning of each frame searching operation, gate 164 is switched on and the double pulses pass through it to count up the counter 56. When the line 59 is energized at the time when the film transport mechanism is slowed down, gate 164 is switched on but is arranged to invert the double pulses so that the counter 56 is counted down.

Figure 3:
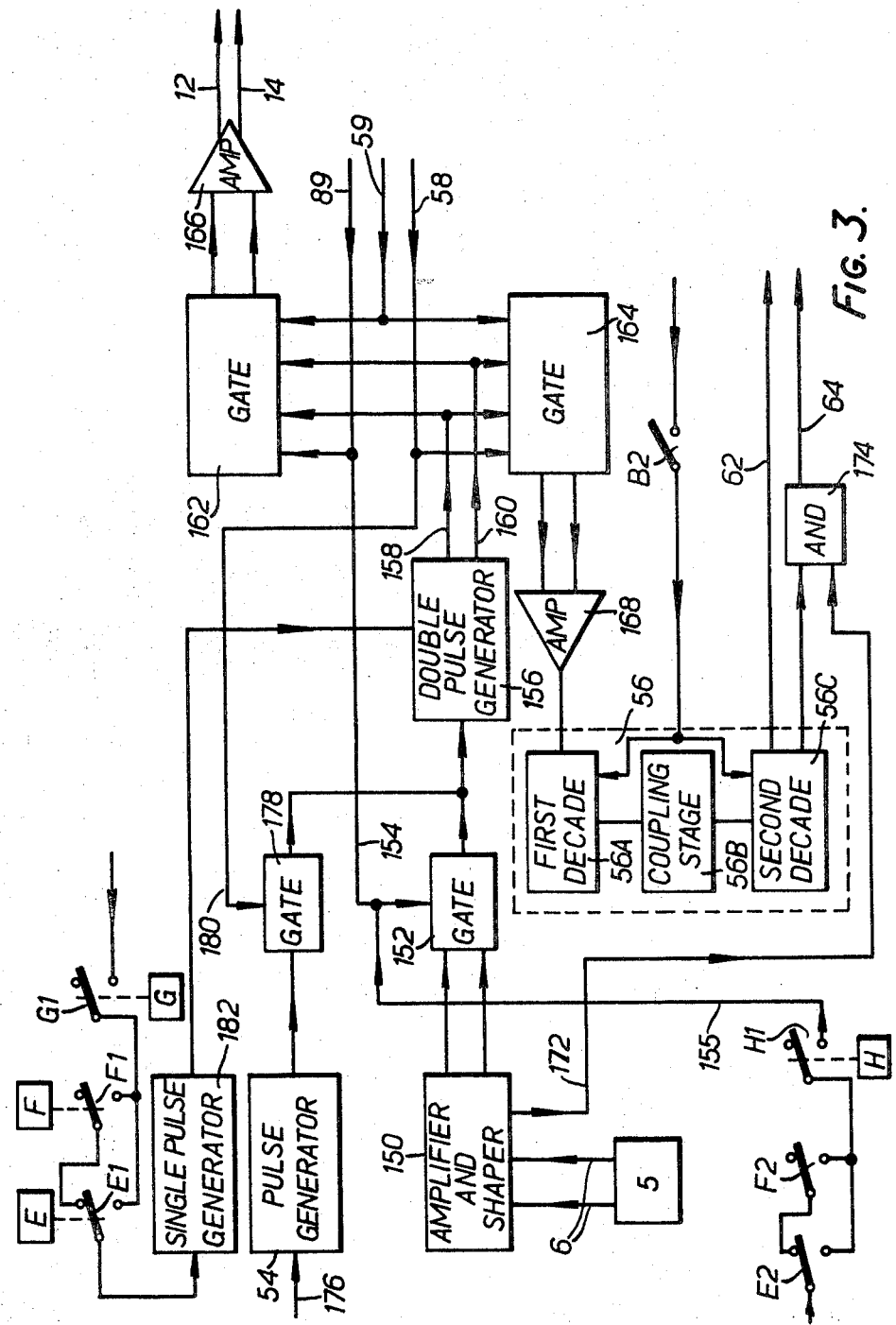
Figure 5B:
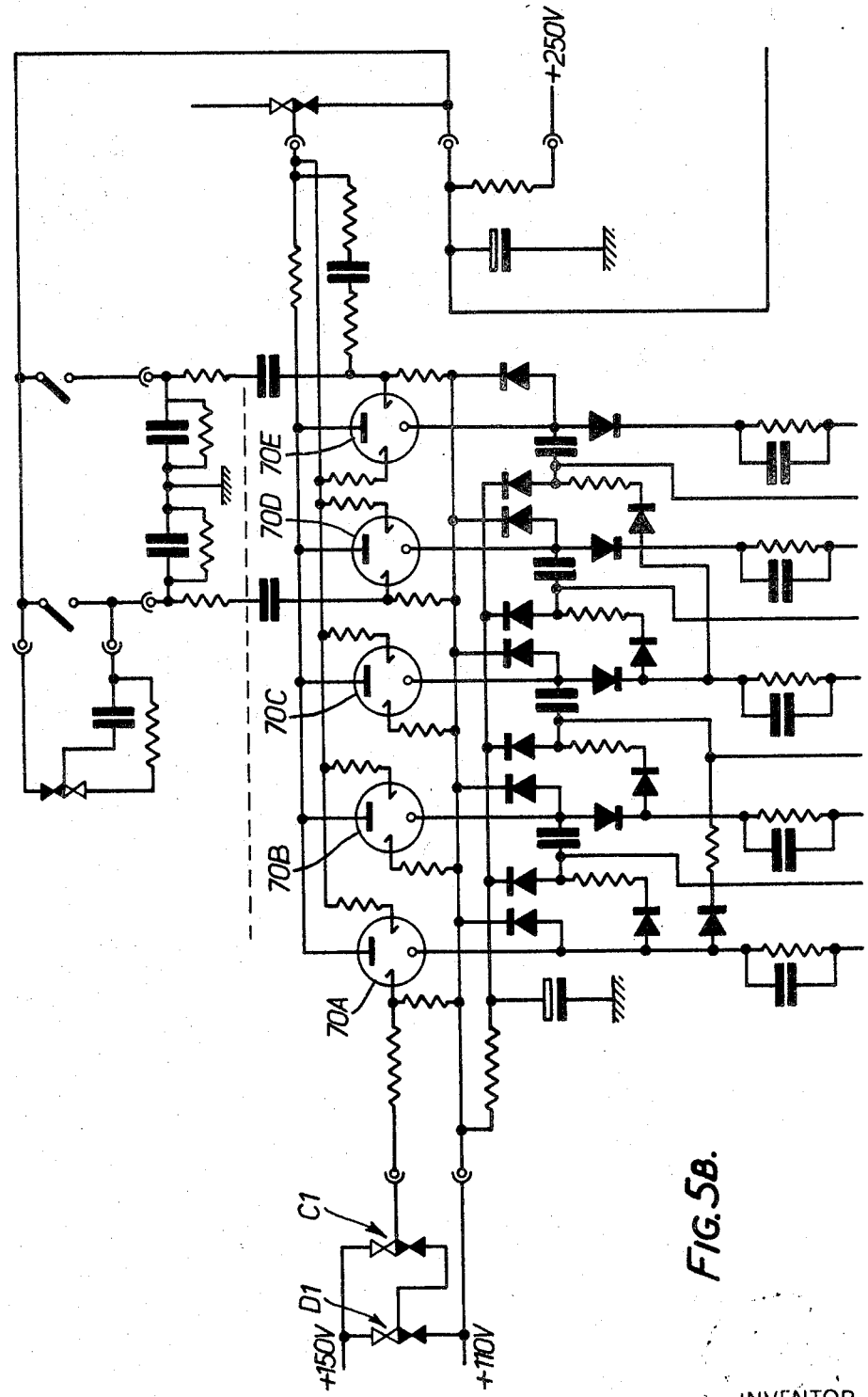
FIGS. 5 to 7F are circuit diagrams of various parts of the apparatus illustrated in FIG. 1.
Figure 5C:
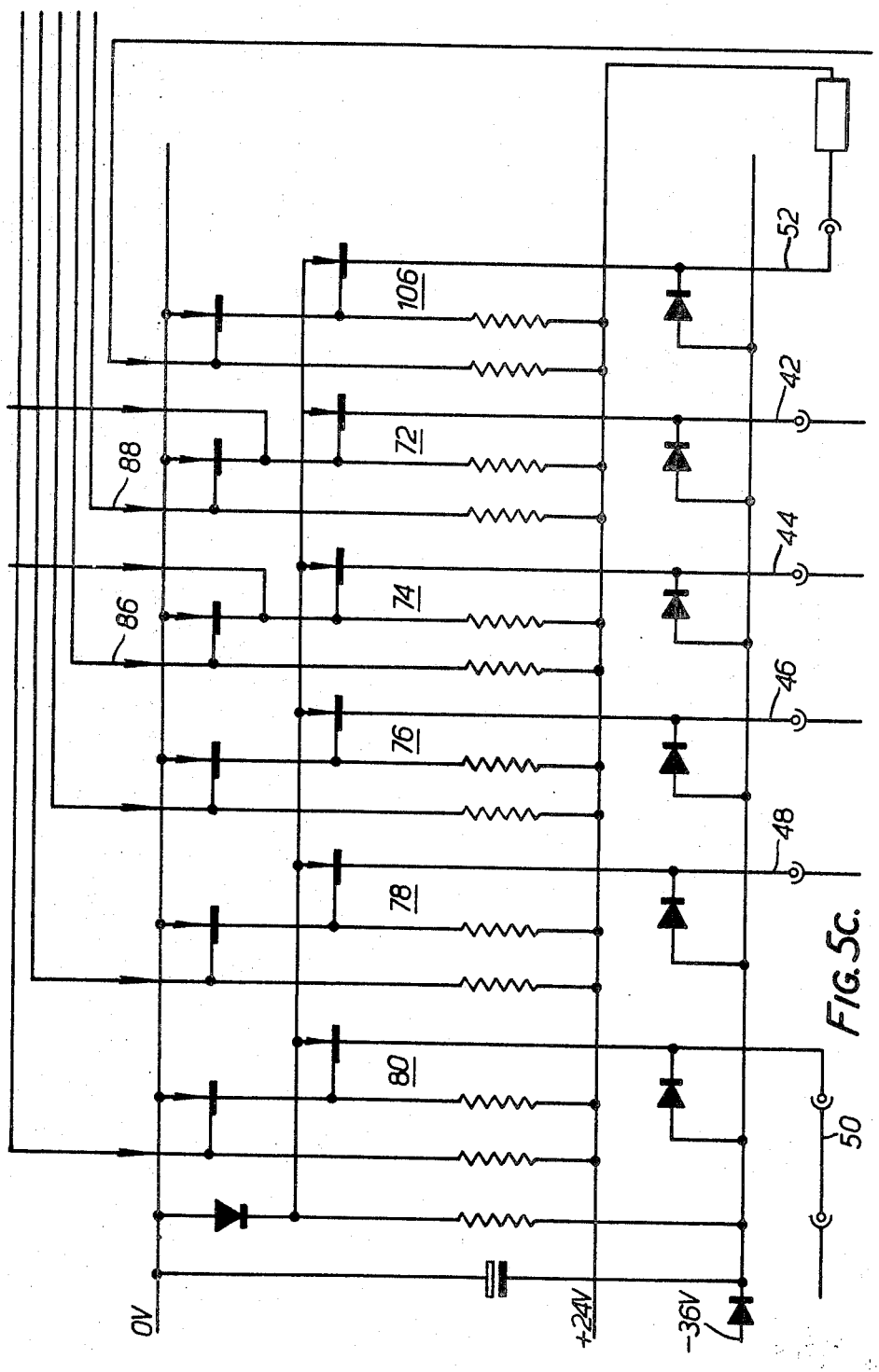
Figure 5D:
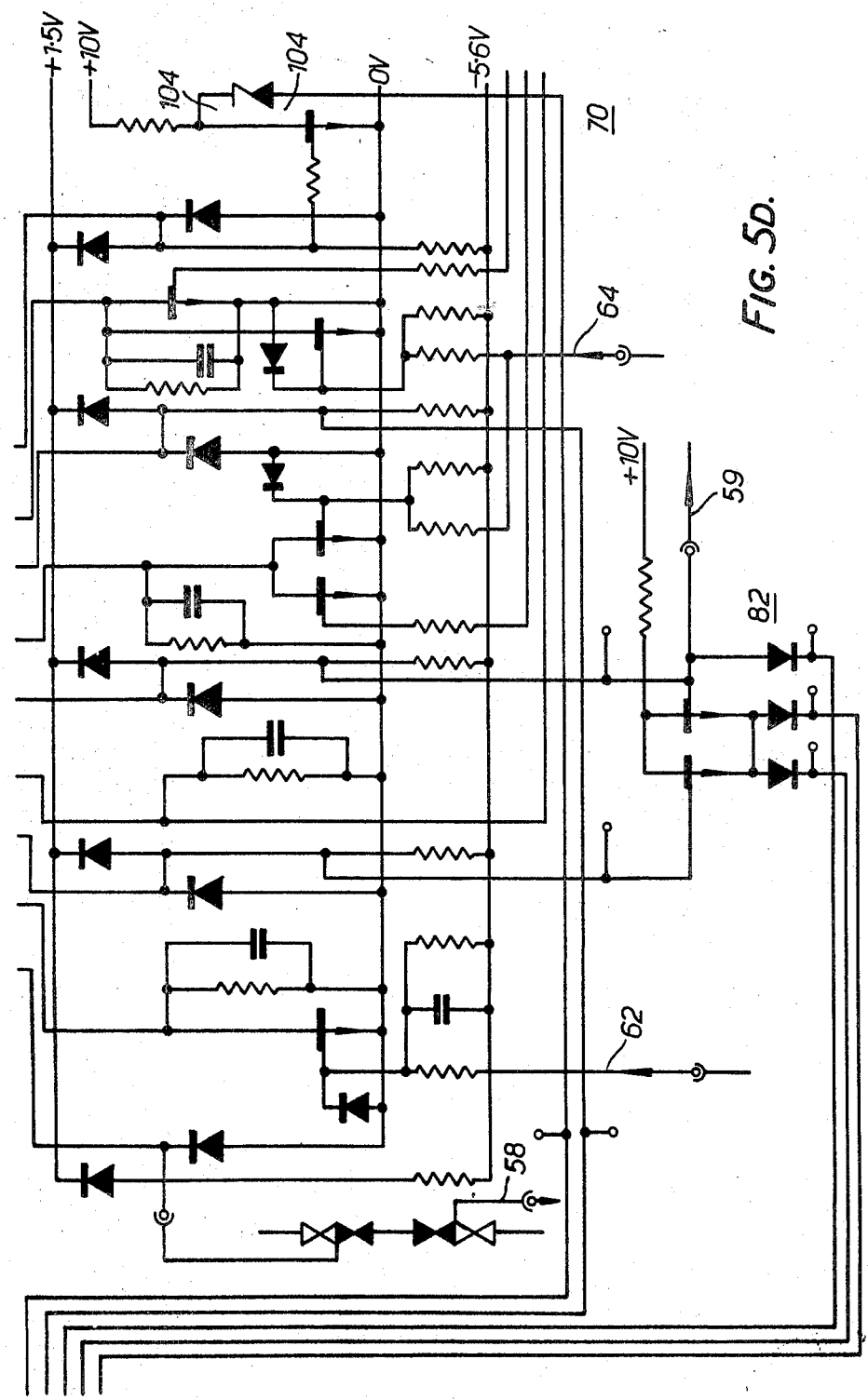
Figure 5E:
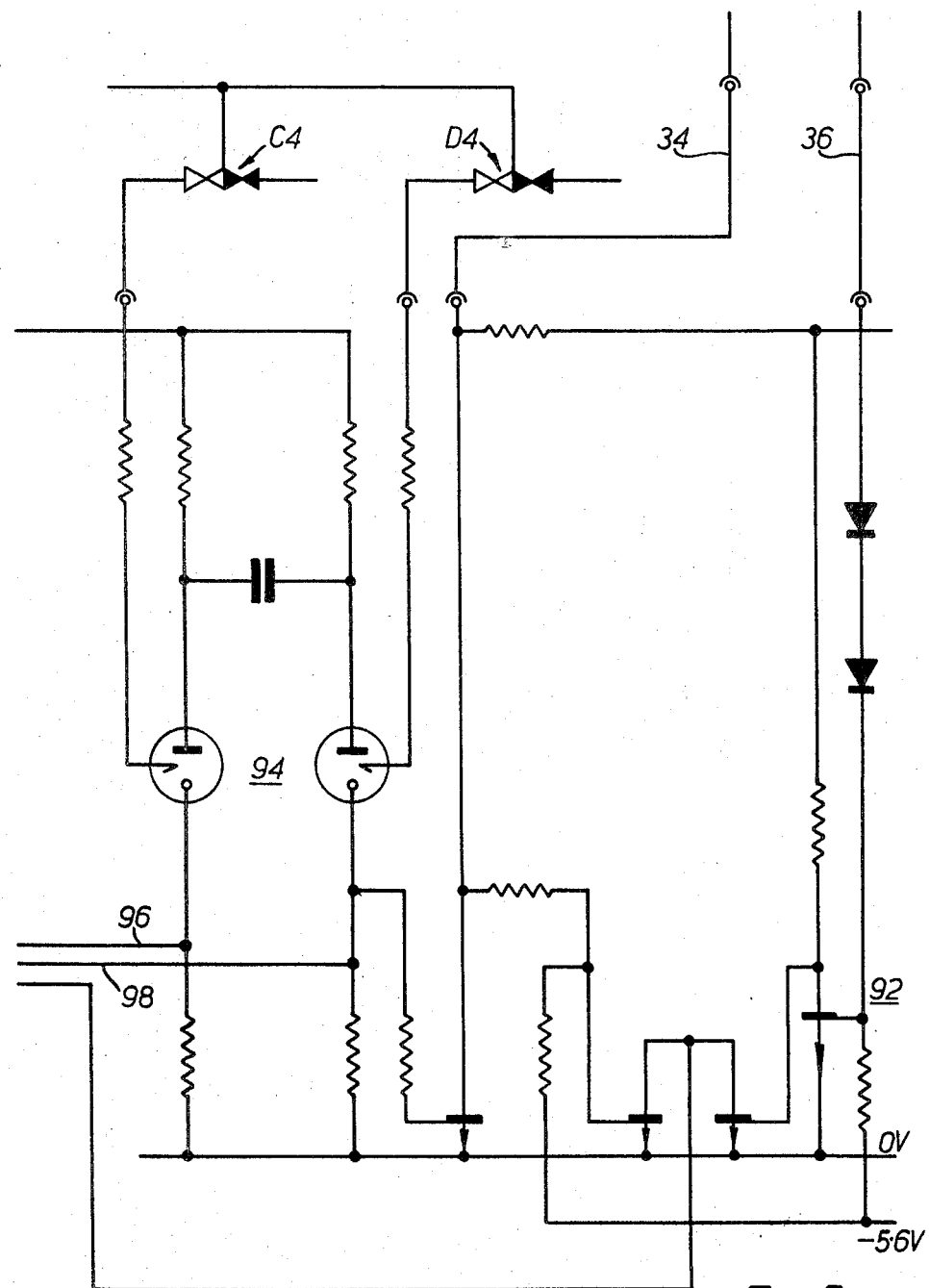
Figure 5F:
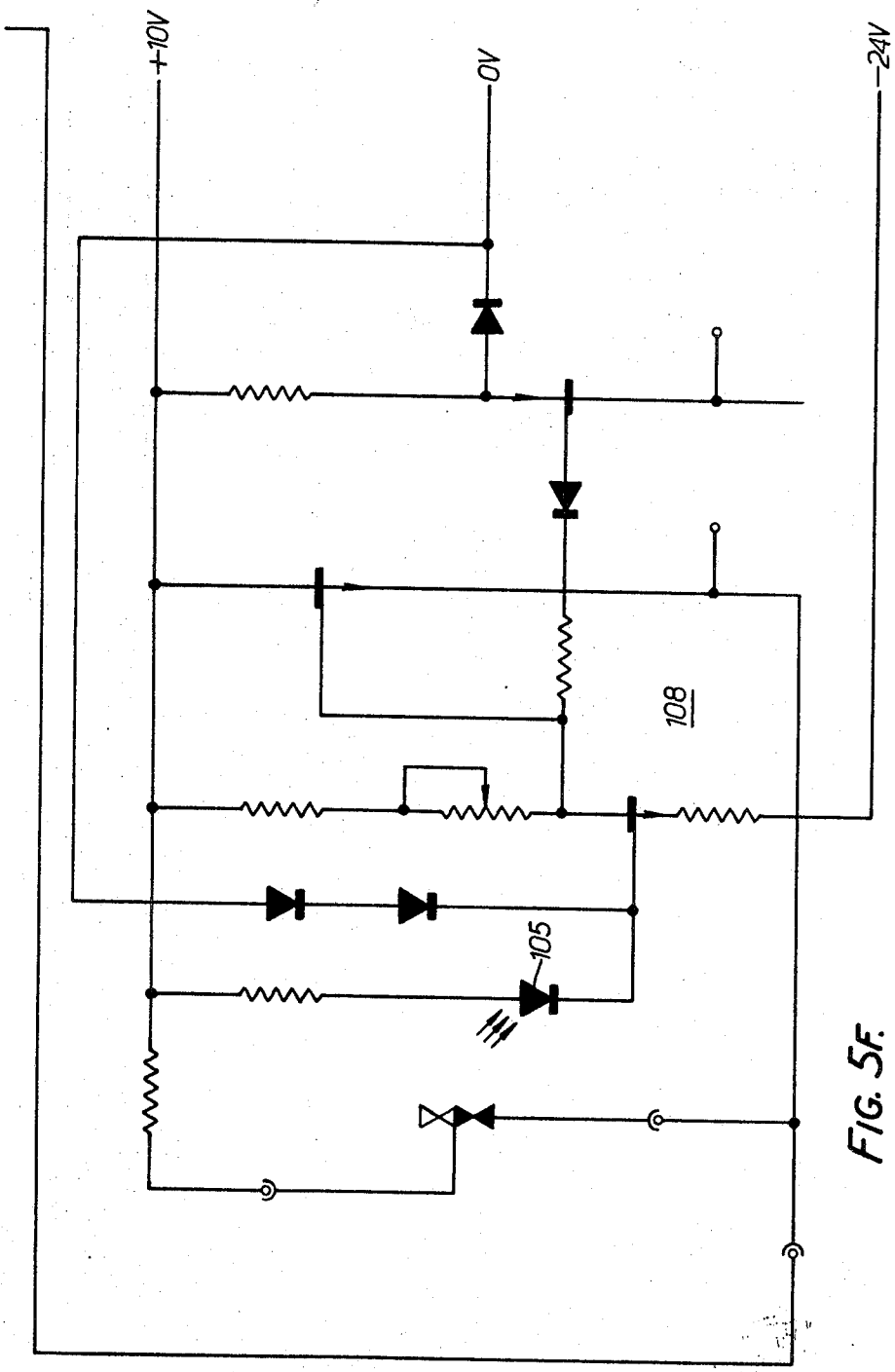
Figure 6B:
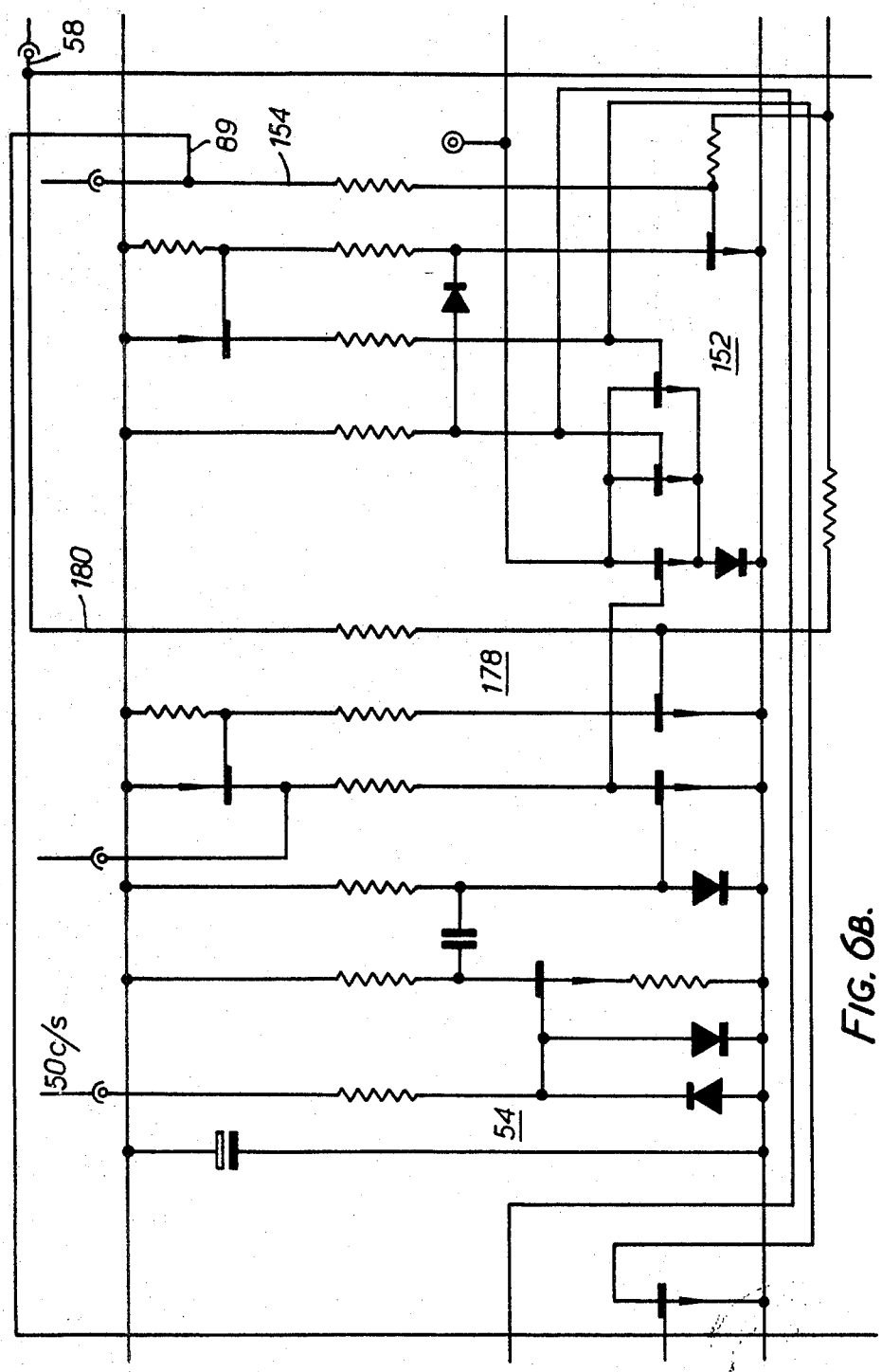
Figure 6D:
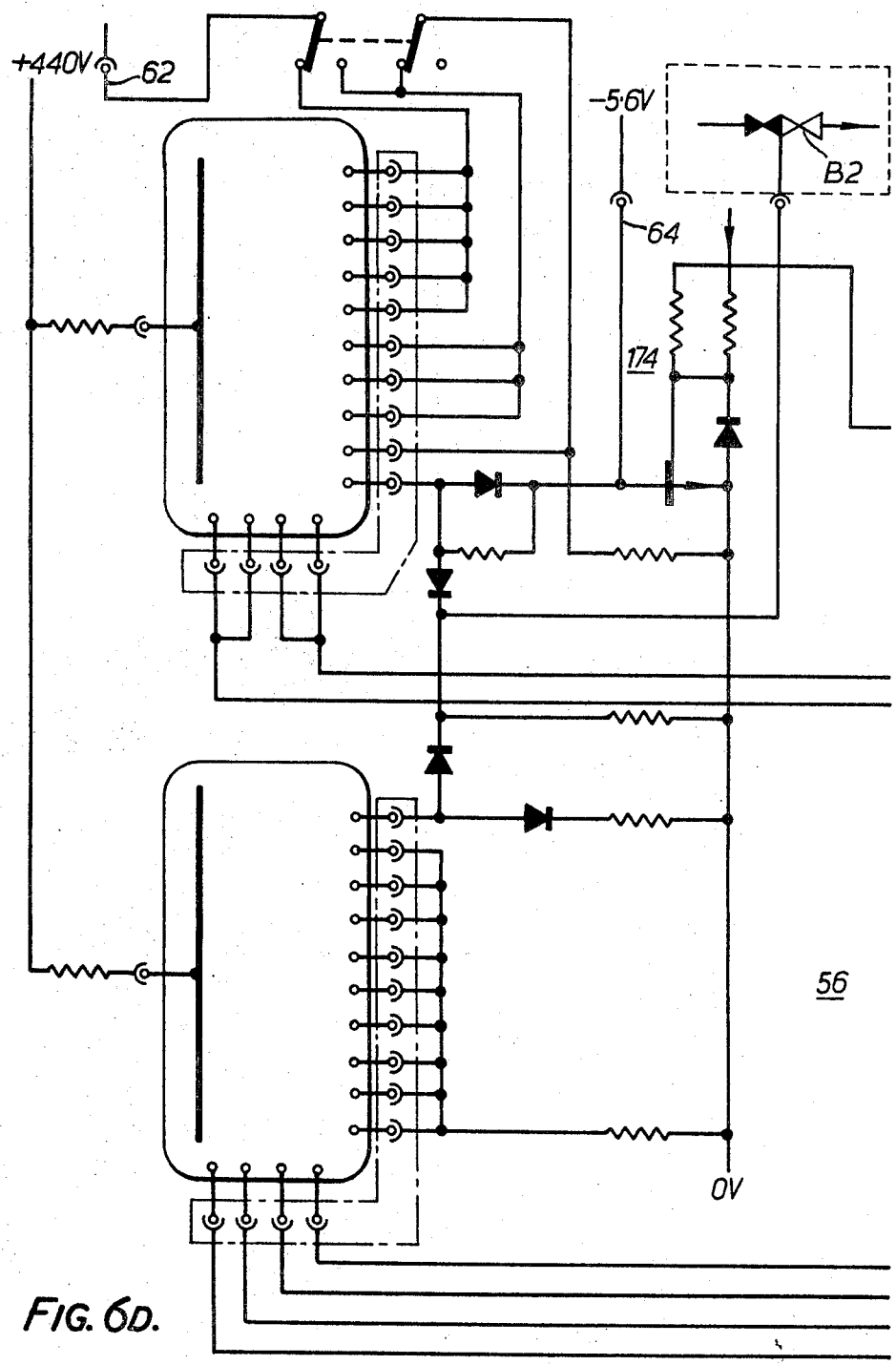
Figure 6E:
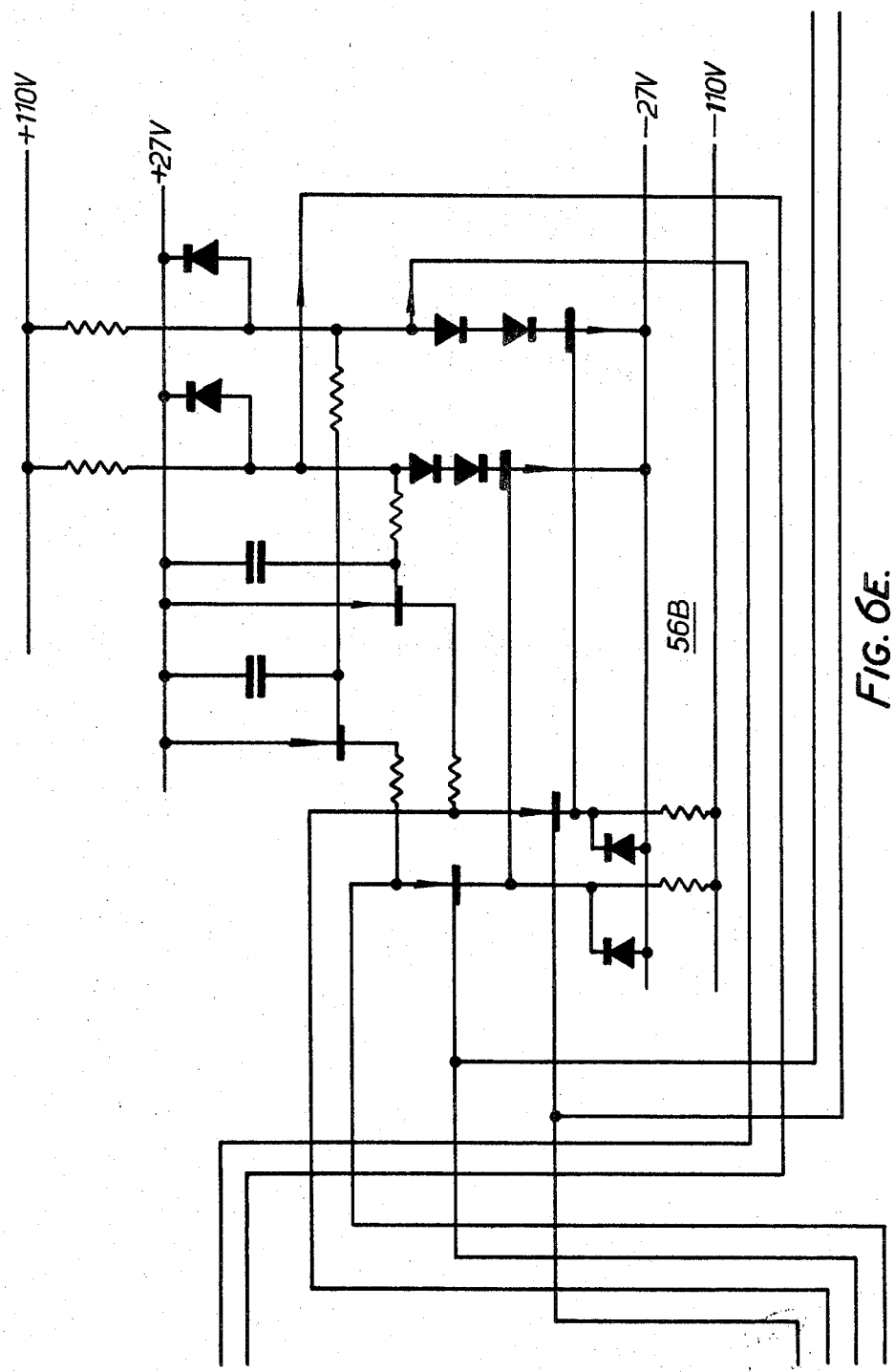
Figure 6F:
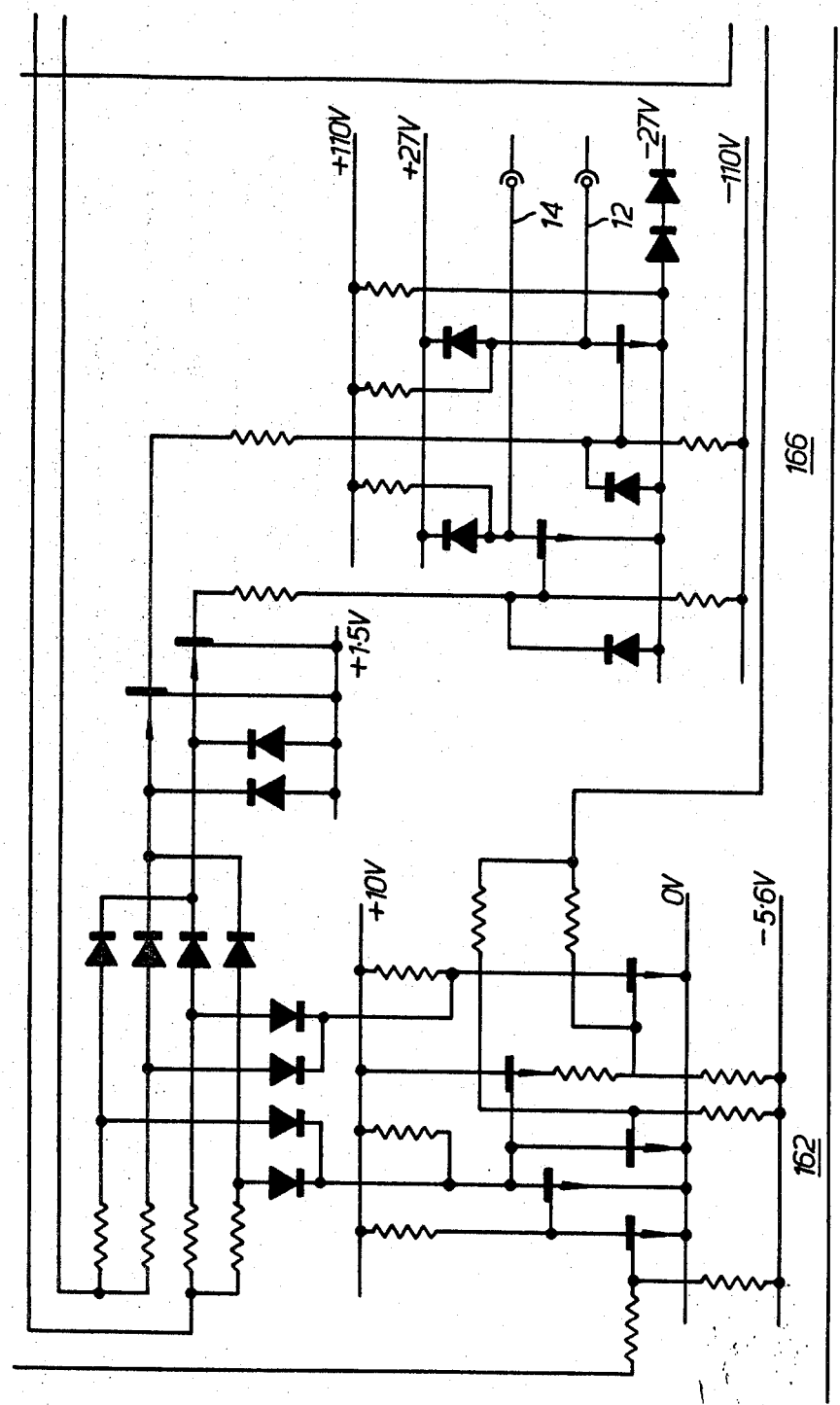
Figure 6G:
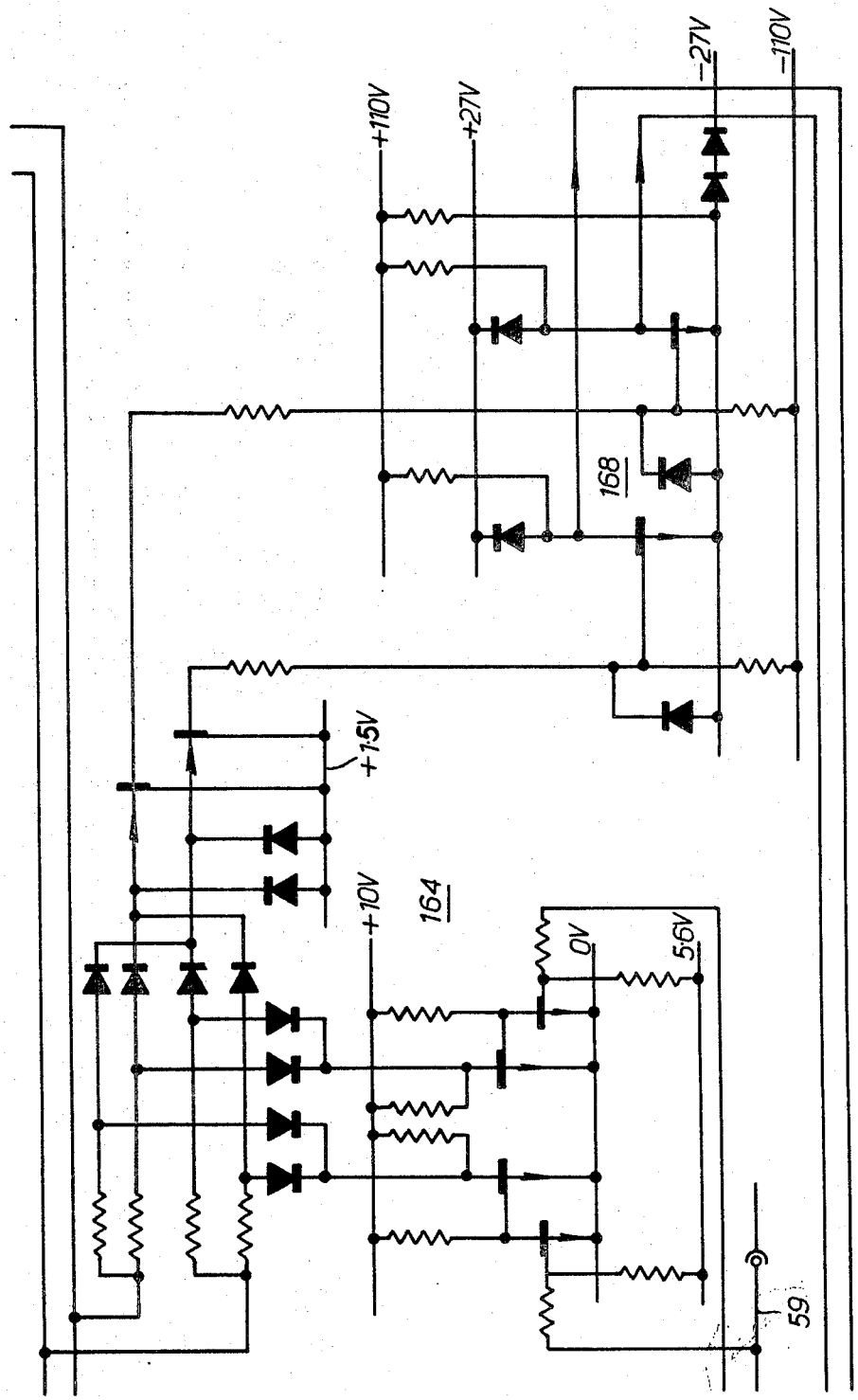

The pulse generator 54 (see also FIG. 1) is energized from the 50 c./s. mains supply by means of a line 176 as shown in FIG. 3. The output of the pulse generator 54 is connected to a normally off gate 178. The gate is switched on by means of the line 180 which is connected to be energized by the line 58, and the pulses which then pass through the gate are fed into the double pulse generator 156.

The count control unit also includes a single pulse generator 182 which can be energized through contacts E1, F1, and G1 which are respectively closed by operation of switches E, F, and G. Contacts E2 and F1, together with contacts H1 of a switch H, control the energization of line 155.

OPERATION

When the operator initiates a searching operation (after inserting the destination and datum numbers into the stores 18 and 20) by operating switch C, the line 58 is energized from the main control unit and the gate 164 is thereby switched on. At the same time, line 180 switches on gate 178 and the pulses from the pulse generator 54 pass through the gate 178. The resultant double pulses from the double pulse generator 156 are fed, by means of lines 158 and 160 and gates 162 and 164, to the location counter 10 (FIG. 1) and the auxiliary counter 56. When the counter 56 reaches its maximum count, line 62 is energized and, as explained above in connected with FIG. 2, stage 70B of the control register 70 is set ON and the film transport mechanism commences to run. Line 58 is deenergized thus closing the gates 164 and 178. The pulses produced by the transducer 5, as the film moves therepast, pass into gate 152 which, because line 154 is not energized, only allows the dark-to-light pulses to pass. These pulses activate the double pulse generator 156 whose output pulses pass through gate 162 to the counter 10.

When the comparator 22 (FIG. 1) detects that the count of counter 10 equals the destination number, the speed of the film transport mechanism is reduced. At the same time, line 59 is energized which switches off the gate 162 and switches the gate 164 into its inverting mode of operation. The pulses now produced by the transducer 5 cause the counter 56 to count down. When the counter reaches zero count, line 170 is energized so that the next pulse from the transducer 5 energizes line 64 to halt the film as explained in connection with FIG. 2. The film will be halted substantially simultaneously with the occurrence, on line 172, of the first pulse after AND gate 174 has been enabled by the energization of line 170. This pulse on line 172 is the light-to-dark pulse produced as the marker associated with the desired film frame moves into position in front of the transducer; therefore, the film is halted with the marker in front of the transducer.

When the operator wishes to rewind the film to the datum position, he operates switch D (FIGS. 1 and 2) and the film commences to reverse (after counter 56 has been counted up). Operation of switch D energizes line 89 (see FIG. 2) so that the gate 162 is switched into its inverting mode and the pulses fed into it cause the counter 10 to count down. In order to ensure correct operation of the counter 10, it is necessary to prevent the dark-to-light pulse produced at the beginning of this reverse film movement (by the marker previously stationary at the transducer 5) from affecting the counter; in other words, the counter 10 should not commence counting down until the next marker affects the transducer 5. In other to achieve this, line 154 is energized from line 89 and switches the gate 152 so that, instead of passing only the dark-to-light pulses, it only passes the light-to-dark pulses. The first light-to-dark pulse to be received will be produced by this next marker and therefore incorrect counting is prevented. It will be seen that line 154 is also energized when the film is running in reverse to search for a lower-numbered destination frame.

Switches E to H enable the count of counter 10 to be altered manually to correct errors.

WRITE CONTROL UNIT DESCRIPTION

The write control unit 24 (FIG. 1) will now be described in detail with reference to FIG. 4.

The write control unit is controlled by the digit keys 26. There are 10 such keys, one for each of the digits 0 to 9, and each key controls six contact. The contacts are arranged in six banks referenced $\bar{I}$, $\bar{II}$, $\bar{III}$, $\bar{IV}$, $\bar{V}$ and $\bar{VI}$. Thus, operation of the 0 digit key closes contacts 0—I, 0—II, 0—III, 0—IV, 0—V and 0—VI. Similarly, operation of the 9 digit key closes contacts 9—I, 9—II, 9—III, 9—IV, 9—V and 9—VI. The other digit keys 1 to 8 and their contacts are omitted from FIG. 4 to aid clarity. The ten sets of contacts in the bank I are respectively connected by lines 200 to the inputs of a routing gate 204 and a routing gate 206. The gate 204 routes writing signals from the contacts to the correct storage locations in the destination store 18 by means of the channel 28 in a manner to be explained. Similarly, the gate 206 routes writing signals to the correct storage locations in the datum store 20 by means of the channel 30.

A shift register 208 is associated with the gate 204 and has four stages 208A, 208B, 208C, and 208D. The four stages correspond to the four decades of each destination number, stage 208A corresponding with the highest decade. The register is set into the condition in which stage 208A is ON by means of contacts A2 operated by switch A.

A resistor 210 is associated with the gate 206 and has four stages 210A, 210B, 210C and 210D, corresponding with the four decades of the datum number, the register being set into the state in which stage 210A is ON by means of contacts B3 operated by switch B.

Shift signals are supplied to the two registers by means of a line 212 which is energized by a pulse generator 214. The latter is energized by closure of any of the contacts in bank II.

The register 210 also controls four pulse generators 216, 218, 220 and 222 which, in a manner to be explained, ensure that during the initial setting up of a datum number, the datum number is written into the counter 10 (FIG. 1) as well as the datum store 20. Each stage of the register 210 is connected to a respective one of the pulse generators 216 to 222 by means of a respective AND gate 224 to 230. The AND gates are connected to the bank II of contacts by means of a line 232 so that the AND gates are enabled whenever one of the keys is connected to a respective one of the banks III to VI of contacts by means of a respective line 234 to 240.

OPERATION

When the destination number is to be written into the destination store 18, the operator closes switch A so that stage 208A of register 208 is set ON by contacts A2. The operator then depresses the appropriate one of the digit keys according to the particular digit in the highest decade of the destination number, and a signal on the appropriate one of the lines 200 is directed by the routing gate 204, which is at this time operating under control of stage 208A, to the appropriate location in the store 18. Operation of the digit key also closes the appropriate contacts in the bank II and thus causes a shift pulse to be produced on line 212 which now switches on stage 208B of the register. The operator now releases the digit key previously set, and sets one of the keys according to the particular digit in the next lower decade of the destination number. The resulting signal on one of the lines 200 is now routed by the gate 204, which is now operating under control of stage 208B, to the appropriate location in the destination store 18. In the same way, the remaining decades of the destination number are set into the store 18.

During the setting up of the destination number, register 210 is inoperative because contacts B3 are open, and therefore the closure of any of the contacts in the bank A has no effect on the gate 206. For the same reason, the pulse generators 216 to 222 are inoperative.

When the datum number is to be set into the store 20, switch A is released and switch B is operated. Register 208 therefore becomes inoperative and register 210 is rendered operative with stage 210A set ON. The operator now operates the keys four times, in a similar fashion to that described above, to set the datum number into the store 20 decade by decade. As each decade is set up, an appropriate one of the pulse generators 216 to 232 is pulsed by the particular stage of the register 210 which is ON and produces a pulse which is fed on the corresponding one of the lines 234 to 240. Thus, when the digit representing the highest decade of the datum number is being set into the store 20, a pulse is produced on line 234. This pulse is routed by the particular one of the contacts in the bank III which is closed at this time to set the highest decade of the location counter 10 to the same number. Similarly, when the digit corresponding to the next lower decade of the datum number is being set into the store 20, a pulse is produced on line 236 and this pulse is routed by the particular one of the contacts IV which is closed at this time to set the next lower decade of the location counter 10. In this way, the location counter 10 is set to the same number as the store 20.

Electrical Circuits

Figures 7, 7A:
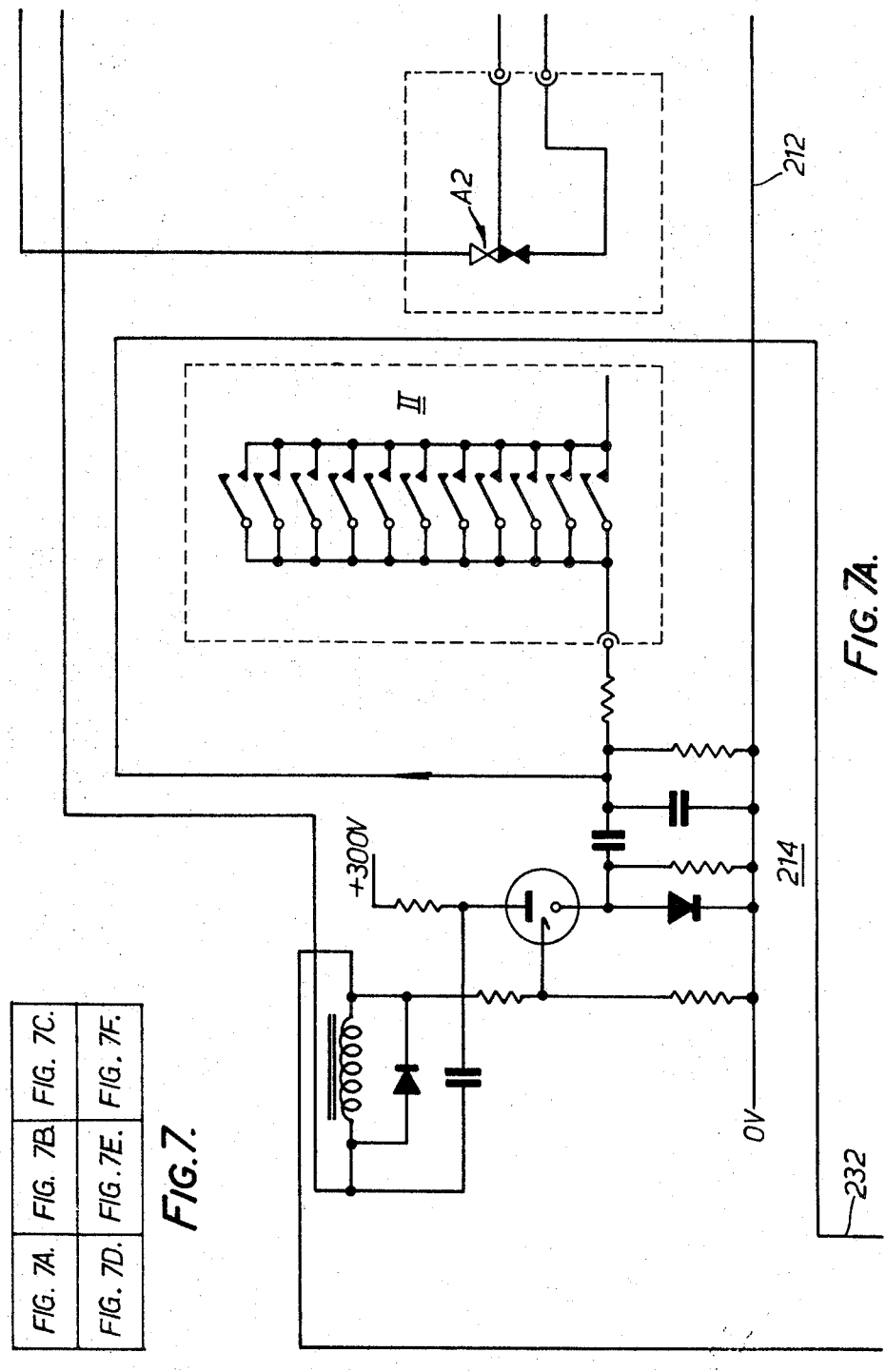
Figure 7B:
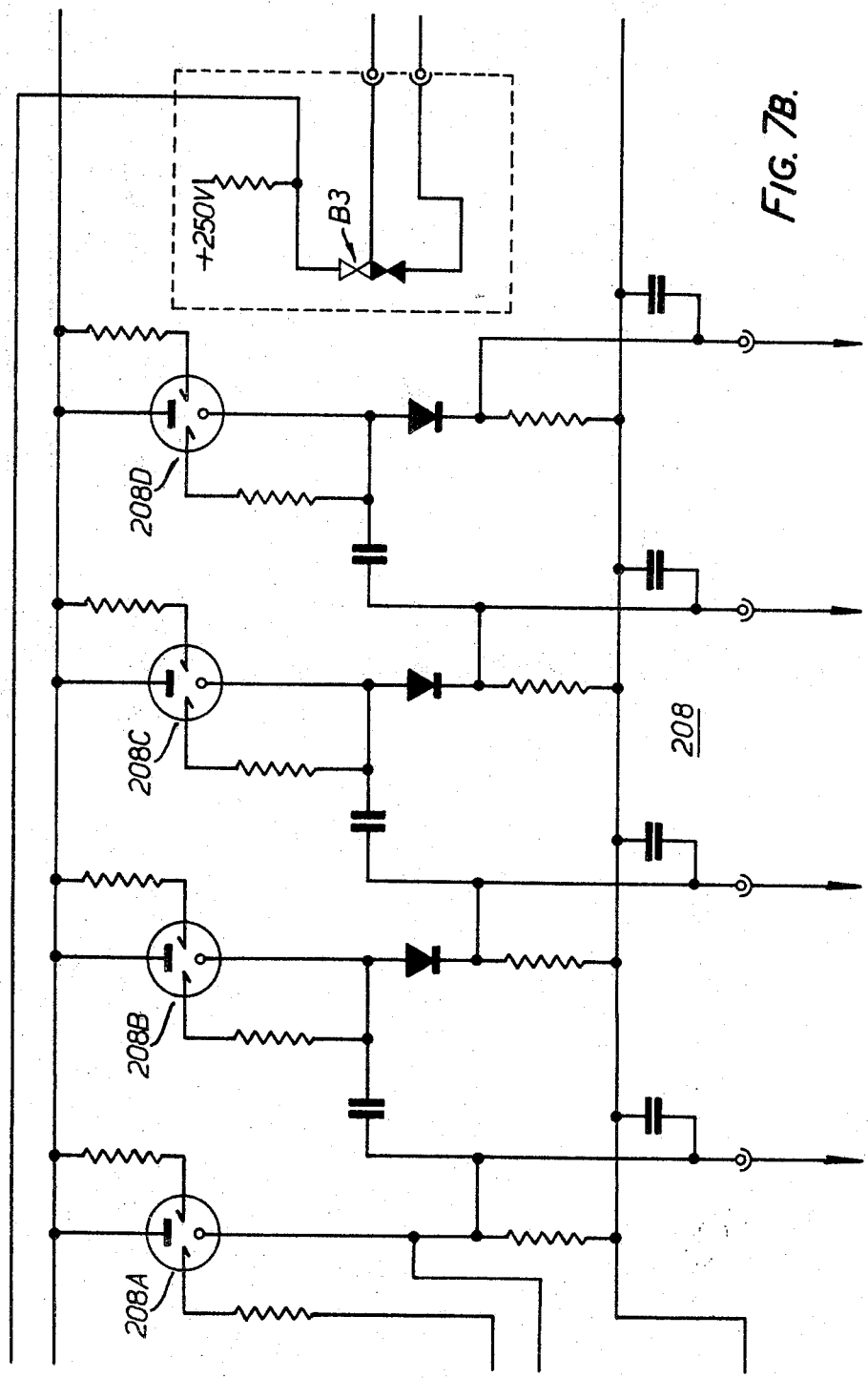
Figure 7C:
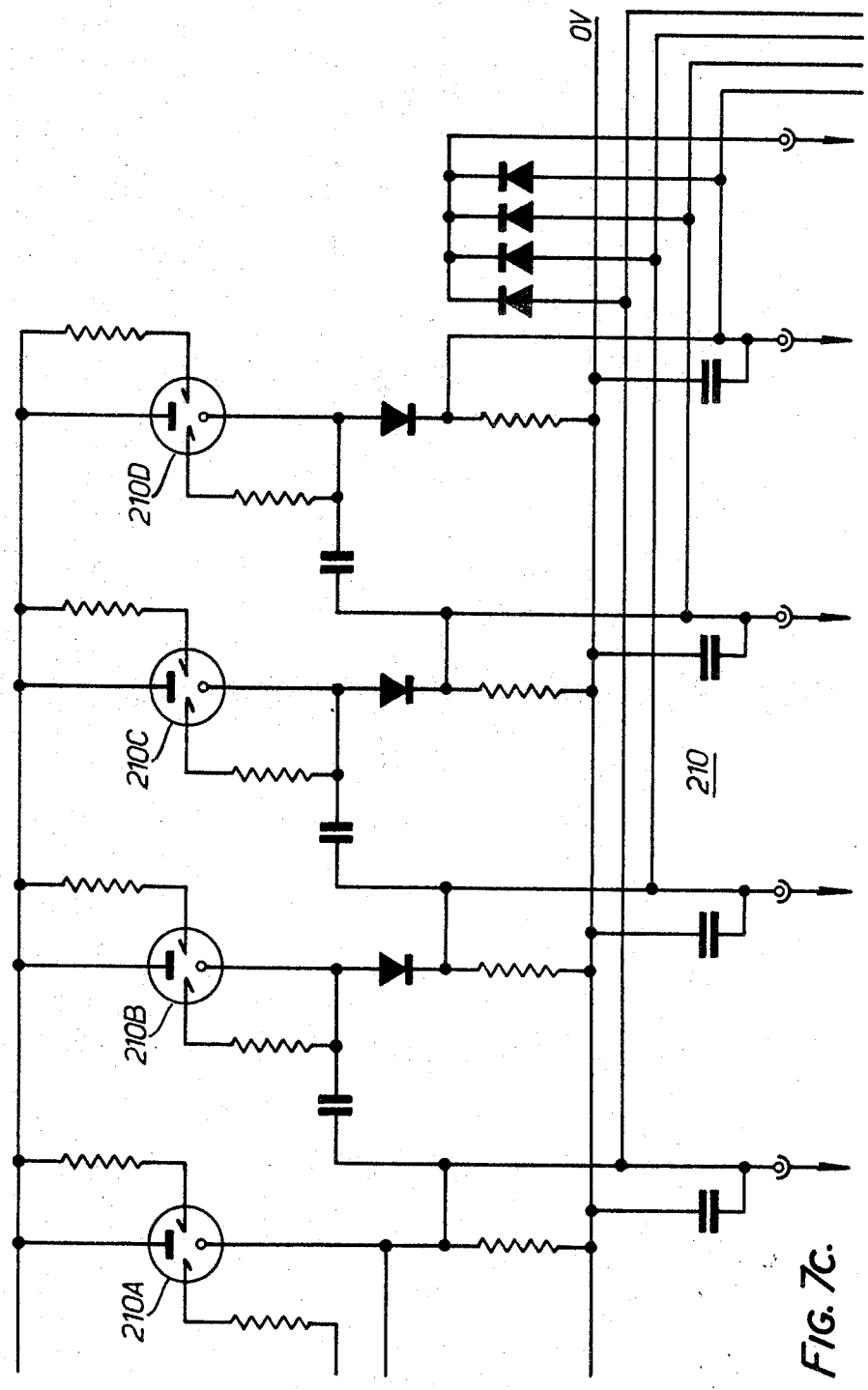
Figure 7B:
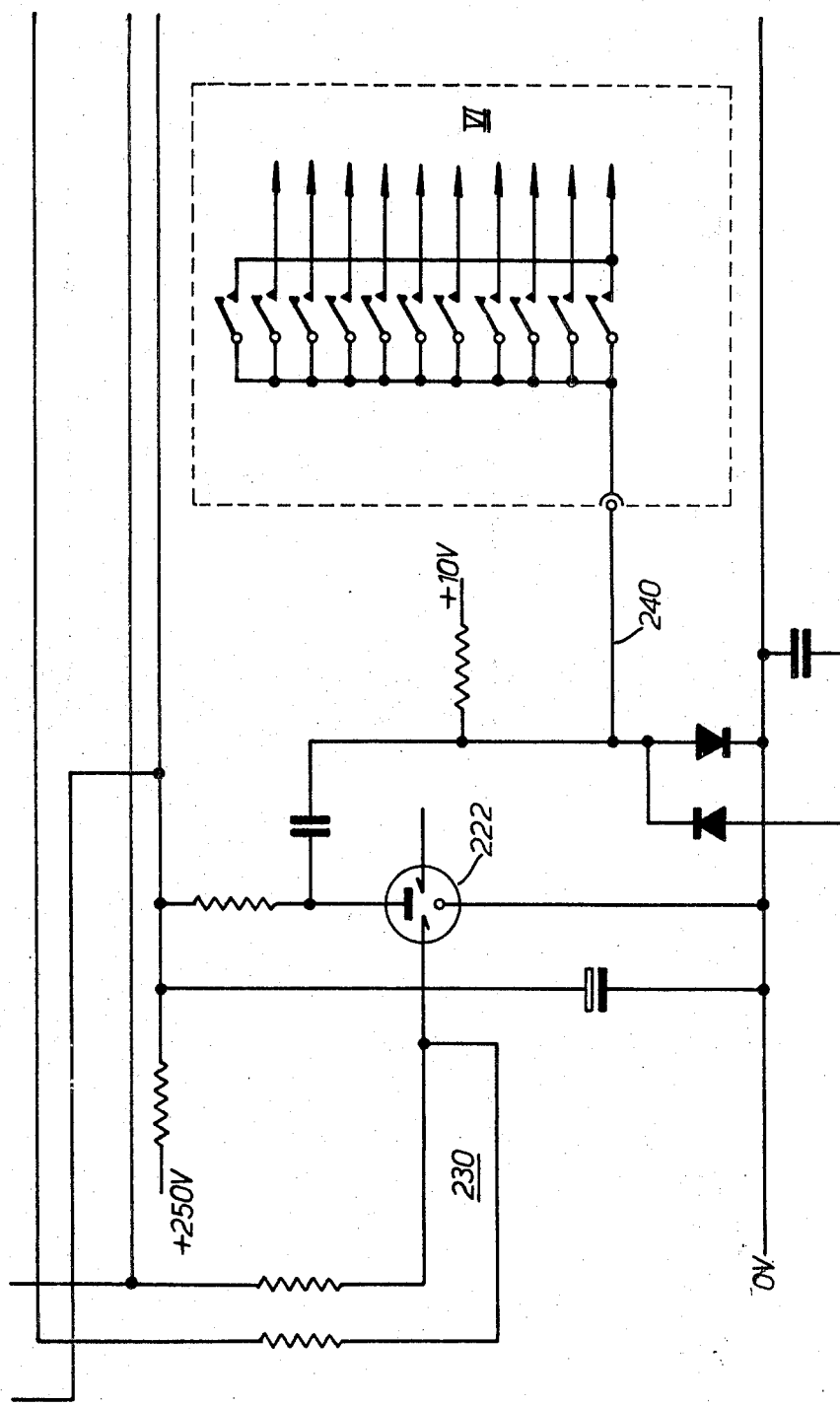
Figure 7E:
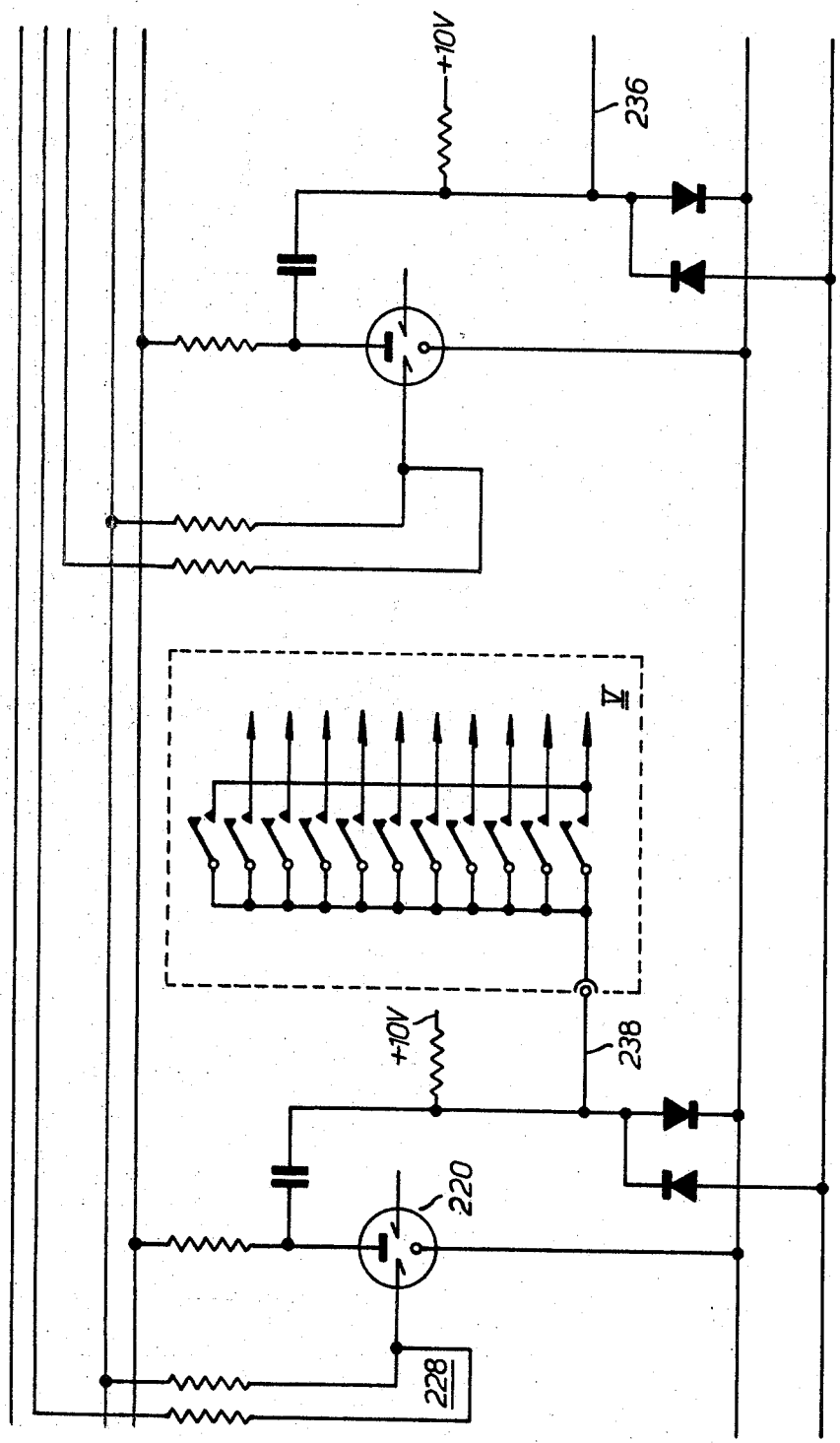
Figure 7F:
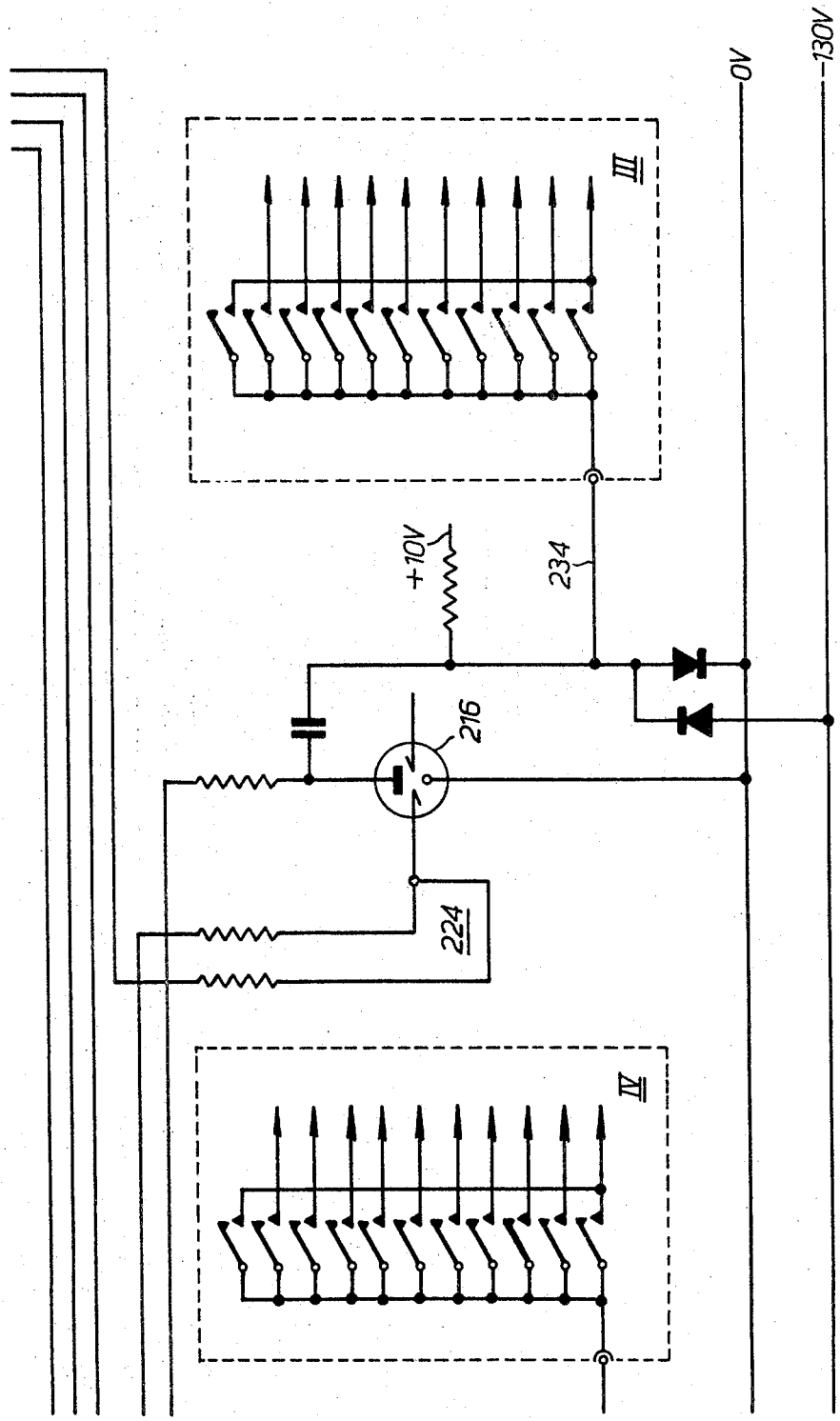

The electrical circuits of the various blocks illustrated in FIGS. 1 to 4 are shown in FIGS. 5 to 7. The reference numbers on the circuit diagrams correspond with the reference numbers on the other FIGS.

General

If the film base is positive (that is, opaque) instead of negative (that is, transparent) then the frame markers will be clear instead of opaque, and many other modifications can be made to the apparatus described without departing from the spirit and scope of the invention as defined in the claims.

I claim:

1. In apparatus having transport mechanism for driving, along a predetermined path, a longitudinally movable recording medium having a plurality of longitudinally arranged areas in which information can be recorded and a respective marker associated with each area, and transducer means adjacent the said path and producing a respective electrical signal in response to the movement of each marker therepast, the improvement comprising:
   counting means connected to count the electrical signals;
   first and second stores, each store having $n$ decade regions, each decade region having a plurality of storage locations;
   first routing means operative, when activated, for accessing the decade regions of the first store in turn;
   second routing means operative, when activated, for accessing the decade regions of the second store in turn;
   means operative to activate each routing means;
   a decade set of keying means;
   a decade set of switch means connected to be operated by the keying means;
   power supply means for energizing the switch means;

a plurality of first output connections connecting the switch means to the first and second routing means, one particular first output connection being energized by the power supply means according to which of the keying means is operated whereby to store a corresponding digit in the particular store region which is accessed at that time by the routing means such that by appropriate selective operation of the keying means as each routing means is activated while the recording medium is stationary the digits of a first number identifying the particular marker in a reference position in the said path are respectively stores in the decade regions of the first store and the digits of a second number identifying the particular marker to be brought, by appropriate movement of the recording medium, to the reference position in the said path are respectively stored in the decade regions of the second store;

n further decade sets of switch means, each decade set being ganged for operation by the keying means;

n input connections respectively associated with the further decade sets of switch means, each input connection being common with all the switch means of the respective further decade set;

n sets of second output connections, each second output connection of a set being connected to a respective switch means of a respective set of the further switch means;

means operative in synchronism with the said second routing means to serially energize the n input connections, whereby, as each input connection is energized, a particular one of the corresponding set of second output connections is energized according to the setting of the keying means;

means connecting the second output connections to the counting means whereby the particular second connection of each set of the second output connections sets into the counting means a different decade of the first number so as to count up the counting means by a count corresponding with the said first number while the recording medium is stationary; and comparing means connected to the counting means and the stores and operative to compare the instantaneous count of the counting means with the said second number as the recording medium moves along the said path, and arranged to produce a transport mechanism-arresting signal when the said count corresponds with the second number.

2. In apparatus having variable speed transport mechanism for driving, along a predetermined path, a longitudinally movable recording medium having a plurality of longitudinally arranged areas in which information can be recorded and a respective marker associated with each area, and transducer means mounted and operative to produce a respective electrical signal in response to the movement of each marker therepast, the improvement comprising:

counting means connected to count the number of electrical signals produced;

storage means operative to store an identifying number identifying a particular marker which is to be positioned, by appropriate movement of the recording medium, in a reference position in the said path;

means operative to add a predetermined number to the count of the counting means so that, as the recording medium moves along the said path, the instantaneous count of the counting means is in excess, by the amount of the said predetermined number, of the number of electrical signals counted;

comparing means connected to the counting means and the storage means and operative to compare the instantaneous count of the counting means with the said identifying number in the storage means;

first control means responsive to the comparing means and arranged to produce a transport mechanism speed reducing signal when the instantaneous count of the counting means corresponds with the identifying number; and second control means operative to produce a transport mechanism arresting signal when the number of electrical signals produced by the transducing means after occurrence of the said speed reducing signal becomes equal to the said predetermined number.

3. Apparatus according to claim 2, in which the counting means includes an auxiliary counter, and including:

pulse generating means operative before the beginning of movement of the recording medium along the said path to count up the auxiliary counter and the counting means by a count equal to the said predetermined number;

gating means operative in response to occurrence of the said control signal to feed each electrical signal produced by the transducer means after occurrence of the said control signal into the auxiliary counter whereby the count down the auxiliary counter; and the second control means being connected to be controlled by the auxiliary counter and operative to arrest the movement of the recording medium when the predetermined number in the auxiliary counter has been completely counted down.

4. In apparatus having transport mechanism for driving, along a predetermined path, a longitudinally movable recording medium having a plurality of longitudinally arranged areas in which information can be recorded and a respective marker associated with each area, and transducer means arranged to produce a respective electrical signal in response to the movement of each marker therepast, each electrical signal comprising first and second time-displaced portions respectively produced by longitudinally-spaced regions of each marker, the improvement comprising:

storage means operative to store an identifying number identifying a particular desired marker which is to be positioned, by appropriate movement of the recording medium along the said path, in a reference position in the path;

counting means connected to the transducer means to count one said portion only of each electrical signal produced by the transducer means;

comparing means connected to the counting means and the storage means and operative to compare the instantaneous count of the counting means with the said identifying number in the storage means whereby to produce a control signal when the instantaneous count corresponds with the identifying number;

control means responsive to the control signal to produce a transport mechanism arresting signal when the particular desired marker is positioned in the said reference position; and gating means connected to the counting means and operative to feed the first portion only of each electrical signal to the counting means, for counting thereby, when the recording medium is moving in one direction along the said path and operative to feed the second portion only of each electrical signal to the counting means, for counting thereby, when the recording means is moving in the opposite direction along the said path, whereby the said one portion of each electrical signal which is counted by the counting means is the portion produced by the leading region of each said marker.

5. Apparatus according to claim 4, in which the storage means comprises first and second stores, and including:

writing means selectively connectable to the first and second stores while the recording medium is stationary and operable to store in the first store a first number identifying the particular marker in the said reference position in the said path and operable to store in the second store the said identifying number of the particular marker to be positioned, by the appropriate movement of the recording medium, in the said reference position in the said path; and transfer means responsive to the writing means and operative while the recording medium is stationary to count up the counting means by a count corresponding with the said first number.

6. Apparatus according to claim 5, including:

means operative to add a predetermined number to the count of the counting means so that, as the recording medium moves along the said path, the instantaneous count of the counting means is in excess, by the amount of the said predetermined number, of the number of electrical signals counted;

the said control means comprising first means operative immediately the control signal occurs to produce a transport mechanism speed reducing signal and second means operative to produce the said transport mechanism arresting signal when the number of electrical signals produced by the transducing means after occurrence of the said control signal becomes equal to the said predetermined number.

7. In apparatus having variable speed transport mechanism for driving, along a predetermined path, a longitudinally movable recording medium having a plurality of longitudinally arranged area in which information can be recorded and a marker on the medium adjacent each said area and having different light-transmitting quality from the surrounding medium, and a photocell mounted to produce a respective electrical signal in response to movement of each marker therepast as the recording medium moves along the said path, each electrical signal comprising two portions one of which represents a light-to-dark transition in the light falling on the photocell and the other of which represents a dark-to-light transition;

storage means operative to store an identifying number identifying a particular desired marker which is to be positioned, by appropriate movement of the recording medium along the said path, in a reference position in the path;

counting means connected to the transducer means to count one said portion only of each electrical signal produced by the transducer means;

comparing means connected to the counting means and the storage means and operative to compare the instantaneous count of the counting means with the said identifying number in the storage means whereby to produce a control signal when the instantaneous count corresponds with the identifying number;

control means responsive to the control signal for producing a transport mechanism arresting signal when the said particular desired marker has been positioned in the said reference position; and gating means connected to the counting means and operative to feed one said portion only of each electrical signal to the counting means, for counting thereby, when the recording medium is moving in one direction along the said path and operative to feed the other said portion only of each electrical signal to the counting means, for counting thereby, when the recording medium is moving in the opposite direction along the said path, whereby the said portion of each electrical signal which is counted by the counting means is the portion produced by the leading edge of each said marker.